(12) United States Patent
Hwang et al.

(10) Patent No.: US 11,455,140 B2
(45) Date of Patent: Sep. 27, 2022

(54) ELECTRONIC DEVICE AND METHOD FOR SAME CONTROLLING EXTERNAL DEVICE

(71) Applicant: SAMSUNG ELECTRONICS CO., LTD., Suwon-si (KR)

(72) Inventors: Doochan Hwang, Suwon-si (KR); Minho Kim, Suwon-si (KR); Jinjoo Chung, Suwon-si (KR); Namhyun Kim, Suwon-si (KR); Sunho Park, Suwon-si (KR); Joonyoung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/261,956

(22) PCT Filed: May 15, 2019

(86) PCT No.: PCT/KR2019/005810
§ 371 (c)(1),
(2) Date: Jan. 21, 2021

(87) PCT Pub. No.: WO2020/045795
PCT Pub. Date: Mar. 5, 2020

(65) Prior Publication Data
US 2021/0303253 A1 Sep. 30, 2021

(30) Foreign Application Priority Data

Aug. 29, 2018 (KR) ........................ 10-2018-0102176

(51) Int. Cl.
*G06F 3/14* (2006.01)
*H04L 65/401* (2022.01)
(Continued)

(52) U.S. Cl.
CPC ............ *G06F 3/1454* (2013.01); *G06F 9/452* (2018.02); *G06Q 20/327* (2013.01); *H04L 65/4015* (2013.01); *H04W 4/80* (2018.02)

(58) Field of Classification Search
CPC ... G06F 3/1454; G06F 9/452; H04L 65/4015; G06Q 20/327; H04W 4/80
See application file for complete search history.

(56) References Cited

U.S. PATENT DOCUMENTS

| 8,775,850 B2 * | 7/2014 | Moy | ........................ | G09G 5/12 |
| | | | | 713/400 |
| 8,839,112 B2 * | 9/2014 | Neerudu | ................. | G06F 9/452 |
| | | | | 715/733 |

(Continued)

FOREIGN PATENT DOCUMENTS

| CN | 103530032 B | * | 5/2018 | ........... G06F 1/1643 |
| CN | 104464238 B | * | 5/2018 | |

(Continued)

OTHER PUBLICATIONS

Aswin Ly, Multi screen apps with DIAL protocol, Sep. 29, 2016, 4 pages (Year: 2016).*

(Continued)

*Primary Examiner* — Yongjia Pan
(74) *Attorney, Agent, or Firm* — Sughrue Mion, PLLC

(57) ABSTRACT

Provided are an electronic device and a method of controlling an external device by the electronic device. According to various embodiments of the present disclosure, a method of controlling an external device by an electronic device includes displaying, on a screen, a first user interface (UI) corresponding to first UI data received from an external server, transmitting, to the external device, second UI data corresponding to the first UI, receiving, from the external device, coordinates selected by a user using the external device, obtaining additional information related to the first (Continued)

UI when the coordinates correspond to a position of the first UI displayed on the screen, and transmitting, to the external device, the additional information and an execution command of an application using the additional information.

14 Claims, 18 Drawing Sheets

(51) Int. Cl.
*G06F 9/451* (2018.01)
*H04W 4/80* (2018.01)
*G06Q 20/32* (2012.01)

(56) References Cited

U.S. PATENT DOCUMENTS

| | | | |
|---|---|---|---|
| 8,963,799 B2* | 2/2015 | Harper | G09G 5/377 345/1.1 |
| 10,575,041 B2 | 2/2020 | Baek et al. | |
| 10,931,735 B2* | 2/2021 | White | H04N 21/4126 |
| 2003/0025678 A1* | 2/2003 | Lee | G06F 3/147 345/173 |
| 2010/0317332 A1* | 12/2010 | Bathiche | H04B 1/202 455/418 |
| 2011/0107388 A1* | 5/2011 | Lee | H04N 7/17318 725/118 |
| 2012/0042102 A1* | 2/2012 | Chung | H04N 21/4126 710/33 |
| 2012/0191569 A1* | 7/2012 | Shah | G06Q 20/405 705/26.41 |
| 2012/0208466 A1* | 8/2012 | Park | G06F 1/1601 455/41.3 |
| 2013/0138728 A1* | 5/2013 | Kim | H04L 12/282 709/203 |
| 2014/0009393 A1* | 1/2014 | Wilson | G06F 3/01 345/156 |
| 2014/0009394 A1* | 1/2014 | Lee | H04N 5/2624 345/157 |
| 2014/0068520 A1* | 3/2014 | Missig | G06F 3/04883 715/841 |
| 2014/0092304 A1* | 4/2014 | Chen | H04N 21/43637 348/552 |
| 2014/0310599 A1* | 10/2014 | Clift | H04N 21/4227 715/719 |
| 2015/0015508 A1* | 1/2015 | Song | G06F 3/0488 345/173 |
| 2015/0020013 A1* | 1/2015 | Kim | G06F 3/0488 715/769 |
| 2016/0080549 A1* | 3/2016 | Yuan | H04N 21/440263 455/420 |
| 2016/0097651 A1 | 4/2016 | Jung et al. | |
| 2016/0313764 A1 | 10/2016 | Park et al. | |
| 2017/0150227 A1* | 5/2017 | Kim | H04N 21/4415 |
| 2018/0205983 A1* | 7/2018 | Lee | H04N 21/254 |

FOREIGN PATENT DOCUMENTS

| | | | | |
|---|---|---|---|---|
| EP | 3200467 A1 | * | 8/2017 | ........... G06F 3/1454 |
| KR | 10-2014-0136799 A | | 12/2014 | |
| KR | 10-2015-0084619 A | | 7/2015 | |
| KR | 10-2016-0009415 A | | 1/2016 | |
| KR | 10-2016-0125248 A | | 10/2016 | |
| KR | 10-2017-0052353 A | | 5/2017 | |
| KR | 10-2017-0081425 A | | 7/2017 | |
| KR | 20170130332 A | * | 11/2017 | ............... G06F 9/54 |
| KR | 1020170081425 | * | 12/2017 | |
| KR | 10-2018-0025763 A | | 3/2018 | |
| KR | 10-2018-0026160 A | | 3/2018 | |

OTHER PUBLICATIONS

DIAL offers open alternative to Apple AirPlay, Jan. 27, 2013, 2 pages (Year: 2013).*
Discovery And Launch protocol specification Version 2.1, 2017, 40 pages (Year: 2017).*
Written Opinion (PCT/ISA/237) and International Search Report (PCT/ISA/210) issued by the International Searching Authority in International Application No. PCT/KR2019/005810, dated Aug. 28, 2019.

* cited by examiner

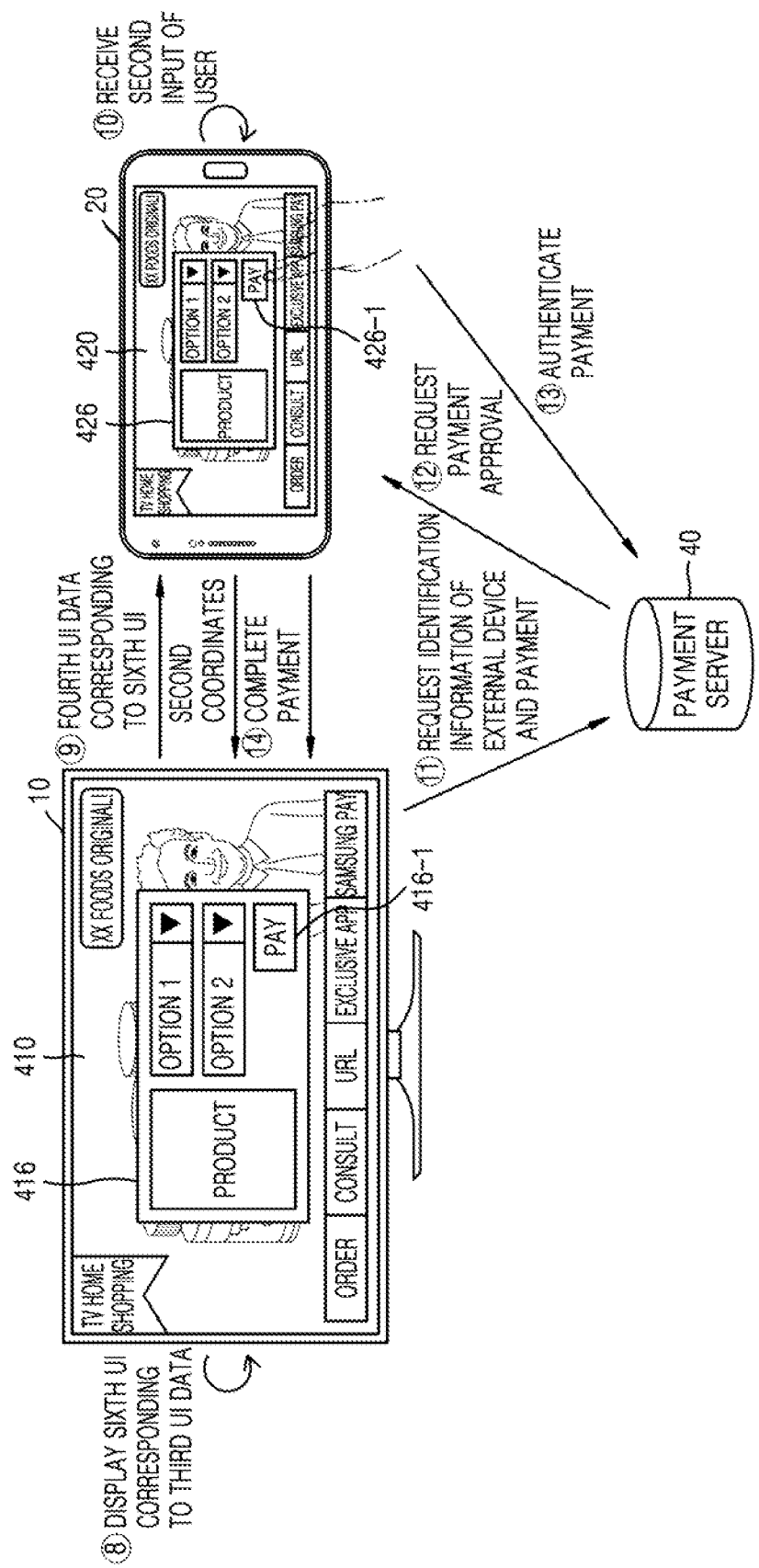

ELECTRONIC DEVICE AND METHOD FOR SAME CONTROLLING EXTERNAL DEVICE

TECHNICAL FIELD

Various embodiments of the present disclosure relate to an electronic device and a method for controlling an external device.

BACKGROUND ART

With the recent development of communication technologies, services using a wired or wireless communication network have been popularized for electronic devices (e.g., display devices such as televisions (TVs), monitors, etc.). In particular, a digital TV provides various services incomparable to an existing analog TV. For example, like an Internet protocol (IP) TV service, a smart TV service, etc., interactive services allow users to actively determine a type and a watching time of a program to be watched. These services may provide various additional services such as Internet surfing, home shopping, online games, etc., as well as providing broadcasting content.

In addition, recently, a screen sharing technique has been used in which electronic devices may be connected (or accessed) through wireless communication therebetween to mirror a screen of a source device onto a screen of a sink device. According to the screen sharing technique, an image being reproduced in a mobile terminal having a small-size display may be provided to a TV having a large-size display. The screen sharing technique has been provided in the name of miracast, screen mirroring, airplay, wireless display (WiD), etc., depending on manufacturers of electronic devices.

In addition, electronic devices have become able to control each other by using wireless communication. For example, to control a large-size electronic device (e.g., a TV, etc.), a remote controller has been used, but recently, it has gradually become possible to control a large-size electronic device with a smartphone by using an application installed in the smartphone.

DESCRIPTION OF EMBODIMENTS

Technical Problem

When an electronic device is controlled using a remote controller, there may be many limitations in usability due to structural reasons of the remote controller. For example, it may be difficult for a traditional remote controller to input a character or point to a desired position of a screen of the electronic device. Moreover, when the remote controller supports many functions, a physical button for supporting each function is required and battery consumption corresponding to support for the function may increase.

To this end, a method of controlling an electronic device by using a remote controller capable of voice recognition, a remote controller capable of pointing, or an application installed in a smartphone has emerged, but such a method fails to largely overcome a limitation of using an existing remote controller and has a difficulty in terms of intuitively controlling the electronic device. Moreover, a wireless mouse or a wireless keyboard may be used, but in this case, a resource processed by a processor of the electronic device may increase and a physical use range of devices may be limited.

Thus, the present disclosure provides a method and apparatus for efficiently controlling an electronic device by using a screen sharing service (e.g., a miracast service) and controlling the electronic device in various ways by using hardware of an external device connected with the electronic device. In particular, the present disclosure also provides a method and apparatus for controlling an electronic device by an external device by using a user input back channel (UIBC).

Technical Solution to Problem

A method of controlling an external device by an electronic device according to various embodiments of the present disclosure includes displaying, on a screen, a first user interface (UI) corresponding to first UI data received from an external server, transmitting, to the external device, second UI data corresponding to the first UI, receiving, from the external device, coordinates selected by a user using the external device, obtaining additional information related to the first UI when the coordinates correspond to a position of the first UI displayed on the screen, and transmitting the additional information and an execution command of an application using the additional information to the external device.

Advantageous Effects of Disclosure

With an electronic device and an operating method thereof according to various embodiments of the present disclosure, a screen of a small-size display device has been shared as a display of a display device, but according to the present disclosure, the small-size display device (e.g., an external device) may control a large-size display device (e.g., an electronic device), thereby providing an intuitive UI to a user and improving convenience in the use of the electronic device.

Moreover, the electronic device may execute an application by transmitting additional information to the external device through a third communication channel (e.g., a home network or a cloud network), enabling the electronic device to handle a user input by using an application stored in the external device. In particular, when a screen sharing service is executed, an authentication procedure is performed between the electronic device and the external device based on approval of the user, such that the user may naturally accept execution of an application of the external device by the electronic device.

Furthermore, as the screen of the large-size display device (e.g., the electronic device) is displayed on the screen of the small-size display device (e.g., the external device) close to the user, the user may have a user experience of intuitively controlling the large-size display device. That is, the user controls the large-size display device in the form of over the top (OTT), and in this case, only a basic function may be handled and a resource of the large-size display device may be insufficient to support various services. Therefore, according to the present disclosure, various services of the electronic device may be supported using a resource of the external device (e.g., a smartphone), thereby expanding a range of a service provided by an external server (a third-party provider). For example, various services such as a phone order, product payment, related link access, watching information search, etc., may be supported using the application of the external device.

In addition, an appropriate UI of the external device may be received from the external server and provided by the electronic device, and easy and intuitive interaction with the external device may become possible in terms of the user. That is, the user may easily obtain additional information through the external device, intuitively control the large-size electronic device, and easily identify the additional information through the external device or the electronic device. That is, beyond a simple screen sharing service between the electronic device and the external device, reliable data transmission/reception may be possible and a UI satisfying both the electronic device and the external device may be provided.

BRIEF DESCRIPTION OF DRAWINGS

FIGS. 4A and 4B are diagrams for describing a process of controlling an external device by an electronic device to pay for a product, according to various embodiments of the present disclosure;

MODE OF DISCLOSURE

Figure 1:
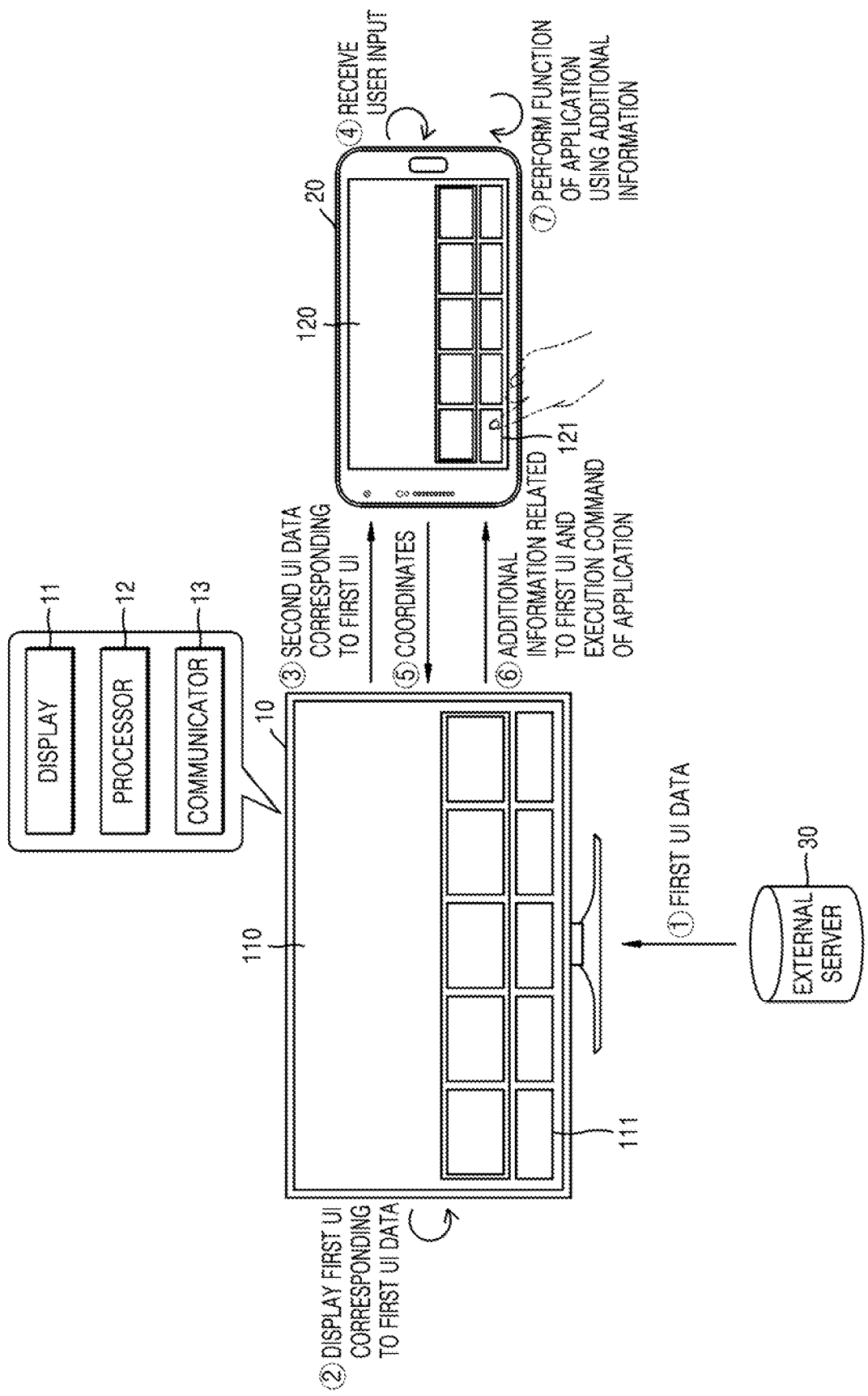
FIG. 1 illustrates a system according to various embodiments of the disclosure.

An electronic device according to various embodiments of the present disclosure includes a communicator configured to communicate with an external server and an external device, a display displaying a user interface (UI), and a processor operatively connected with the communicator and the display, in which the processor is configured to display a first UI corresponding to first UI data received from the external server on a screen, to control the communicator to transmit second UI data corresponding to the first UI to the external device, to control the communicator to receive coordinates selected by a user using the external device from the external device, to obtain additional information related to the first UI when the coordinates correspond to a position of the first UI displayed on the screen, and to control the communicator to transmit the additional information and an execution command of an application using the additional information to the external device.

A computer program product according to various embodiments of the present disclosure includes a computer-readable recording medium including instructions set to cause an electronic device to perform operations of displaying, on a screen, a first user interface (UI) corresponding to first UI data received from an external server, transmitting, to the external device, second UI data corresponding to the first UI, receiving, from the external device, coordinates selected by a user using the external device, obtaining additional information related to the first UI when the coordinates correspond to a position of the first UI displayed on the screen, and transmitting the additional information and an execution command of an application using the additional information to the external device.

Hereinafter, various embodiments of the present disclosure will be disclosed with reference to the accompanying drawings. Embodiments and terms used therein are not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements. It is to be understood that a singular form of a noun corresponding to an item may include one or more of the things, unless the relevant context clearly indicates otherwise. In the present disclosure, an expression such as "A or B," "at least one of A or/and B," or "one or more of A or/and B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor (AP)) that can perform a corresponding operation by executing at least one software program stored at a memory device.

Herein, the term "user" may refer to a person who uses the electronic device or a device using the electronic device (e.g., an artificial intelligence electronic device).

In the present disclosure, a user interface (UI) may be a user interface capable of unidirectionally or bidirectionally interacting between a user and an electronic device. When the UI is displayed on the screen of the electronic device, the UI may be a graphics user interface (GUI).

FIG. 1 illustrates a system according to various embodiments of the disclosure.

In FIG. 1, the system may include an electronic device 10 (e.g., a first electronic device or source device) and at least one external device 20 (e.g., a second electronic device or sink device).

The electronic device 10 may include at least one of, for example, a smart television (TV), a smartphone, a tablet personal computer (PC), a laptop computer, a desktop, a video phone, an electronic-book (e-book) reader, a personal digital assistant (PDA), a portable multimedia player (PMP), an electronic board, medical equipment, a camera, or a wearable device. The electronic device 10 ma include a set-top box or an Internet protocol (IP) set-top box. The set-top box or the IP set-top box may mean a device that provides a multimedia communication service by using an external network. The set-top box or the IP set-top box may provide broadcasting contents in connection with an external image display device. In the present disclosure, the electronic device 10 may be, for example, a smart TV.

The external device 20 may include at least one of, for example, a smartphone, a smart TV, a tablet PC, a laptop computer, a desktop, a video phone, an e-book reader, a PDA, a PMP, an electronic board, medical equipment, a camera, or a wearable device. In the present disclosure, the external device 20 may be, for example, a smartphone.

The electronic device 10 and the external device 20 may be implemented with a display device that may further include a display. For example, the electronic device 10 and the external device 20 may be implemented with not only a flat display device, but also a curved display device provided with a screen having a curvature or a flexible display device having an adjustable curvature. An output resolution of the electronic device 10 and the external device 20 may include, for example, high definition (HD), full HD, ultra HD, or a higher resolution than ultra HD.

The electronic device 10 may communicate with an external server 30. The external server 30 may be a server run/managed by, for example, a $3^{rd}$-party contents provider. The $3^{rd}$-party contents provider may include, for example, a terrestrial broadcasting station, a cable TV broadcasting station, an IP-TV broadcasting station, a smart TV (e.g., TV plus or channel plus, etc.) provider, and so forth, without being limited to the above-described example.

The electronic device 10 may be connected with the external device 20 by performing wireless communication (e.g., Bluetooth, Bluetooth low energy (BLE), Wireless Fidelity (WiFi), etc.). The external device 20 may include a smartphone as an example of a device capable of displaying. In this case, a screen sharing service may be executed in which a screen displayed on the electronic device 10 is displayed on a display of the external device 20 for sharing through wireless connection (or access) between the electronic device 10 and the external device 20. The service (or function) may be referred to as miracast, screen mirroring, airplay, WiD) etc., according to a manufacturer.

In FIG. 1, the external server 30 may transmit the first UI data to the electronic device 10 in operation (1). The electronic device 10 may control the display to display a first UI 111 corresponding to the first UI data on a screen 110, by rendering the received first UI data, in operation (2).

In this situation, the screen sharing service may be executed between the electronic device 10 and the external device 20. Thus, the electronic device 10 may transmit second UI data corresponding to the first UI 111 to the external device 20 through a screen sharing channel, in operation (3). The electronic device 10 may transmit video data being displayed on the screen 110 of the electronic device 10, together with the second UI data, to the external device 20, and may independently transmit the second UI data and the video data to the external device 20.

The external device 20 having received the second UI data may display a screen 120 including a second UI 121 corresponding to the second UI data. The external device 20 may receive a users input to select the second UI 121 in operation (4). For example, the user's input may be a user's input to touch the second UI 121. According to the users input, the external device 20 may transmit coordinates selected by the user to the electronic device 10, in operation (5). For example, the external device 20 may transmit the coordinates to the electronic device 10 through a user input back channel (UIBC).

The electronic device 10 may perform a function (or command) corresponding to the first UI 111, when the received coordinates correspond to a position of the first UI 111 displayed on the screen 110. For example, the electronic device 10 may obtain device information related to the external device 20 through a negotiation procedure in screen sharing connection (e.g., miracast connection) with the external device 20. The electronic device 10 may identify at least one of a resolution or a size of the display of the external device 20, based on device information. The device information may include at least one of operation mode (portrait mode or landscape mode) information of the external device 20, manufacturer information of the external device 20, or model name information of the external device 20. The electronic device 10 may identify coordinates on the screen of the electronic device 10, which correspond to coordinates on the screen of the external device 20, based on at least one of the operation mode information of the external device 20, the resolution or the size of the display of the external device 20. More specifically, when a screen mapping table is stored between the electronic device 10 and the external device 20, the electronic device 10 may determine the coordinates on the screen of the electronic device 10, which correspond to the coordinates on the screen of the external device 20, by using the screen mapping table. When the coordinates of the screen of the electronic device 10 correspond to the position of the first UI 111, the electronic device 10 may perform a function corresponding to the first UI 111.

For example, the electronic device 10 may obtain additional information related to the first UI 111. The electronic device 10 may transmit the additional information and an execution command of an application using the additional information to the external device 20, in operation (6). For example, the electronic device 10 may transmit the additional information and the execution command of the application to the external device 20 through a home network ora cloud network. The external device 20 having received the additional information and the execution command of the application may perform a function of the application using the additional information, in operation (7).

According to various embodiments of the present disclosure, the electronic device 10 may include a display 11, a processor 12, and a communicator 13.

The display 11 may display information (e.g., UI data) processed by the processor 12. The communicator 13 may communicate with at least one of the external device 20 or the external server 30. The display 12 may be operatively connected with the display 11 and the communicator 13. The processor 12 may control the display 11 to display the first UI corresponding to the first UI data received from the external server 30 through the communicator 13. The processor 12 may control the communicator 13 to transmit the second UI data corresponding to the first UI to the external device 20. In this case, the processor 12 may control the communicator 13 to transmit the second UI data to the external device 20 through the screen sharing channel. The processor 12 may control the communicator 13 to transmit video data being displayed on the screen, together with the second UI data, to the external device 20.

The processor 12 may receive coordinates selected by the user using the external device 20 from the external device 20 through the communicator 13. For example, the processor 12 may receive coordinates from the external device 20 over the UIBC through the communicator 13. When the coordinates correspond to the position of the first UI displayed on the screen, the processor 12 may obtain the additional information related to the first UI. For example, the processor 12 may identify coordinates on the screen of the electronic device 10, which correspond to the received coordinates, and obtain the additional information related to the first UI when the identified coordinates correspond to the position of the first UI displayed on the screen. For example, the processor 12 may obtain the additional information related to the first UI from the external server 30.

The processor 12 may control the communicator 13 to transmit the additional information and the execution command of the application using the additional information to the external device 20. When the additional information includes contact information, the execution command of the application may include an execution command of a phone application, an execution command of an e-mail application, or an execution command of a messenger application. When the additional information includes payment information, the execution command of the application may include an execution command of the payment application.

According to various embodiments, the processor 12 may control the communicator 13 to transmit identification information of the external device 20 to the external server 30. The processor 12 may obtain the identification information of the external device 20 in a screen sharing connection procedure with the external device 20. The processor 120 may receive third UI data reflecting the screen of the external device 20 from the external server 30 through the communicator 13 and control the communicator 13 to transmit fourth UI data corresponding to the third UI data to the external device 20.

Figure 2:
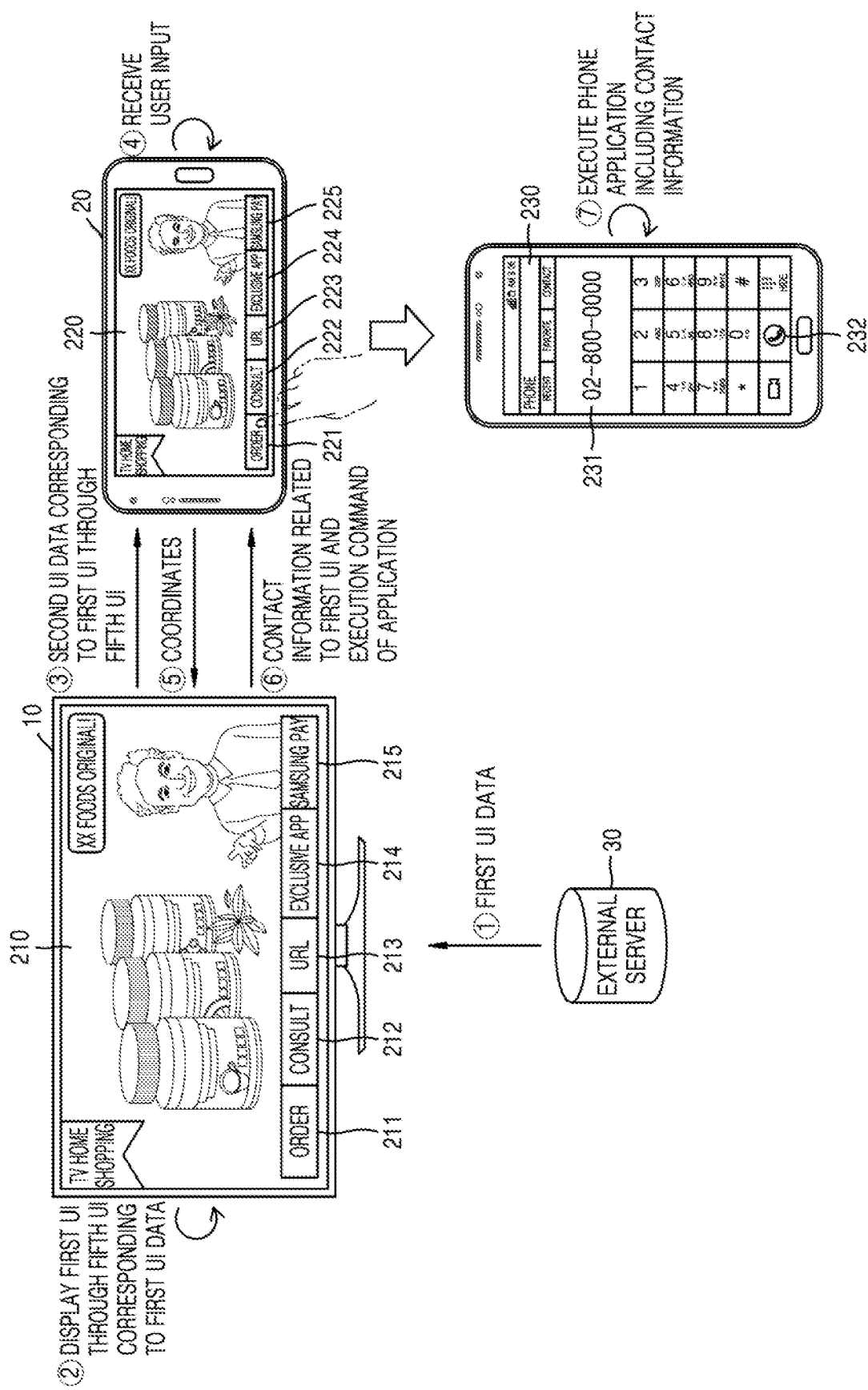
FIG. 2 is a diagram for describing a process of controlling an external device by an electronic device to connect to contact information, according to various embodiments of the present disclosure.

FIG. 2 is a diagram for describing a process of controlling an external device by an electronic device to connect to contact information, according to various embodiments of the present disclosure.

In FIG. 2, when the electronic device 10 displays home shopping broadcasting on a screen 210, the electronic device 10 may receive first UI data from the external server 30 in operation (1). The electronic device 10 may display first through fifth UIs 211 through 215 corresponding to first UI data on the screen by rendering the first UI data, in operation (2). The first through fifth UIs 211 through 215 may be UIs related to the screen 210 being displayed. For example, when the screen 210 being displayed is a home shopping screen, the first UI 211 may be a UI for ordering the product, the second UI 212 may be a UI for consulting about a product, the third UI 213 may be a uniform resource locator (URL) for searching for product-related information, the fourth UI 214 may be an exclusive application execution UI for purchasing the product, and the fifth UI 215 may be a UI for paying for the product through Samsung Pay.

In this situation, the screen sharing service may be executed between the electronic device 10 and the external device 20. When the screen sharing service is executed, the electronic device 10 may transmit second UI data corresponding to the first through fifth UIs 211 through 215 to the external device 20 through the screen sharing channel, in operation (3). The electronic device 10 may transmit video data being displayed on the screen 210 of the electronic device 10, together with the second UI data, to the external device 20.

The external device 20 having received the second UI data may display a screen 220 including first through fifth UIs 221 through 225 corresponding to the second UI data. The external device 20 may receive a user's input to select the first UI 221 in operation (4). According to the users input, the external device 20 may interoperatively execute an application corresponding to a selected position, installed in the external device 20. Alternatively, according to the user's input, the external device 20 may transmit coordinates corresponding to the position selected by the user to the electronic device 10, in operation (5).

When the received coordinates correspond to the position of the first UI 211 displayed on the screen 210 of the electronic device 10, the electronic device 10 may perform an ordering function corresponding to the first UI 211. For example, the electronic device 10 may obtain contact information for purchasing a home shopping product being displayed on the screen 12, as the additional information related to the first UI 211. The contact information may be, for example, a phone number, an e-mail address, a messenger identification (ID), etc. The electronic device 10 may request the additional information (e.g., a phone number) to the external server 30 and obtain the additional information in response to the request. Alternatively, when the external server 30 receives the first UI data, the additional information may also be received together. In this case, the electronic device 10 may obtain additional information previously stored in the memory.

The electronic device 10 may transmit the contact information and an execution command of an application using the contact information to the external device 20, in operation (6). The execution command of the application may include an execution command of a phone application, an execution command of an e-mail application, or an execution command of a messenger application.

Figure 3:
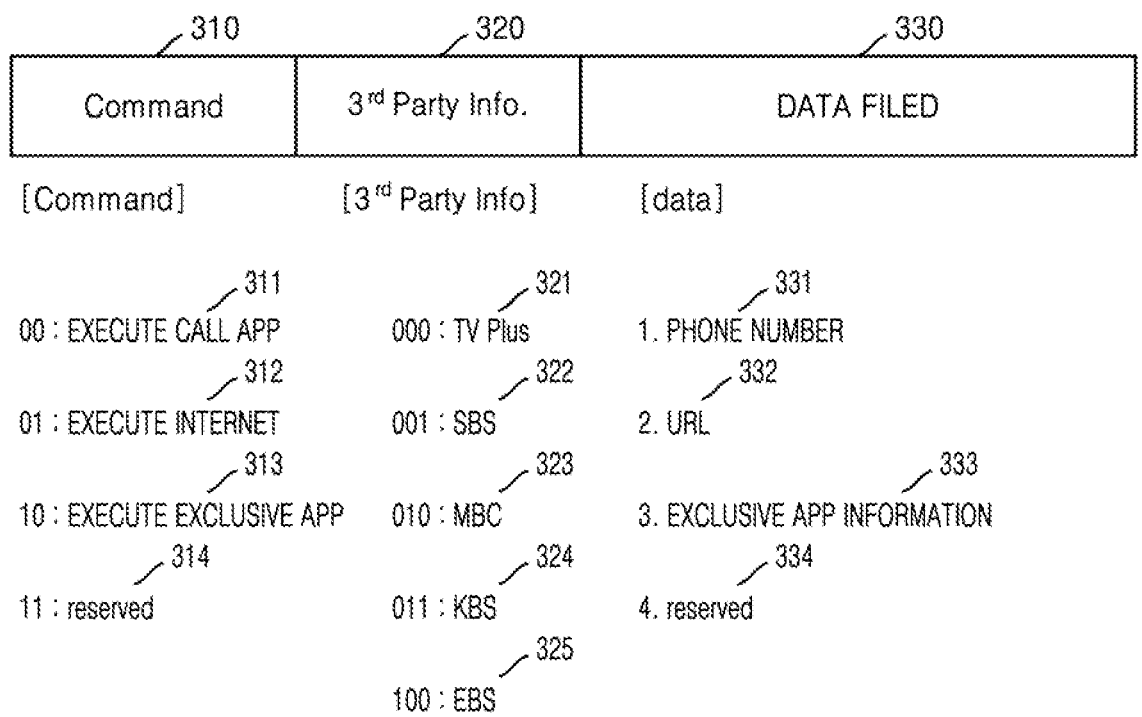
FIG. 3 illustrates an example of a structure of a message transmitted by an electronic device to an external device.

FIG. 3 illustrates an example of a structure of a message transmitted by the electronic device 10 to the external device 20. The message may include, for example, a hypertext transfer protocol (HTTP) request message. A structure of the message may include, for example, an instruction field 310, a $3^{rd}$-party information field 320, and a data field 330. The instruction field value may include, but not limited to, a field value 311 for executing a call application (phone application), an Internet application execution value 312, an exclusive application execution value 313, ora reserved value 314. The $3^{rd}$-party information field value may include, but not limited to, for example, a TV plus provider value 321, a first channel broadcasting station (e.g., Seoul Broadcasting System (SBS)) value 322, a second channel broadcasting station (e.g., Munwha Broadcasting Corporation (MBC)) value 323, a third channel broadcasting (e.g., Korean Broadcasting System (KBS)) value 324, a fourth channel broadcasting station (e.g., Educational Broadcasting System (EBS)) value 325, etc. The data field value may include, for example, a phone number 331, an URL 332, exclusive application information 333, or a reserved value 334.

Referring back to FIG. 2, the external device 20 may receive a message including contact information and an execution command of an application from the electronic device 10. When the execution command of the application is an execution command of a phone application, the external device 20 may execute a phone application 230. In this case, the external device 20 may execute the phone application 230 including contact information 231 by using the received contact information as an input to the phone application, in operation (7). Upon reception of a users input to select a call button 232 of the phone application 230, the external device 20 may send a call to a contact number.

According to various embodiments, when the received coordinates from the external device 20 correspond to the position of the fifth UI 215 displayed on the screen 210, the electronic device 10 may perform a payment function corresponding to the fifth UI 215. The electronic device 10 may transmit payment information and an execution command of an application using the payment information to the external device 20. The execution command of the application may include, for example, an execution command of a payment application (e.g., a Samsung Pay application). The external device 20 may receive the payment information and an execution command of an application from the electronic device 10. When the execution command of the application is an execution command of the payment application, the external device 20 may execute the payment application (e.g., the Samsung Pay application). In this case, the external device 20 may execute the payment application including the payment information by using the received payment information as an input to the payment application. Upon execution of the payment application, the user of the external device 20 may approve payment of a product by using the payment application. For example, the user may approve payment of the product according to a payment scheme through fingerprint recognition or a password.

Figure 4A:
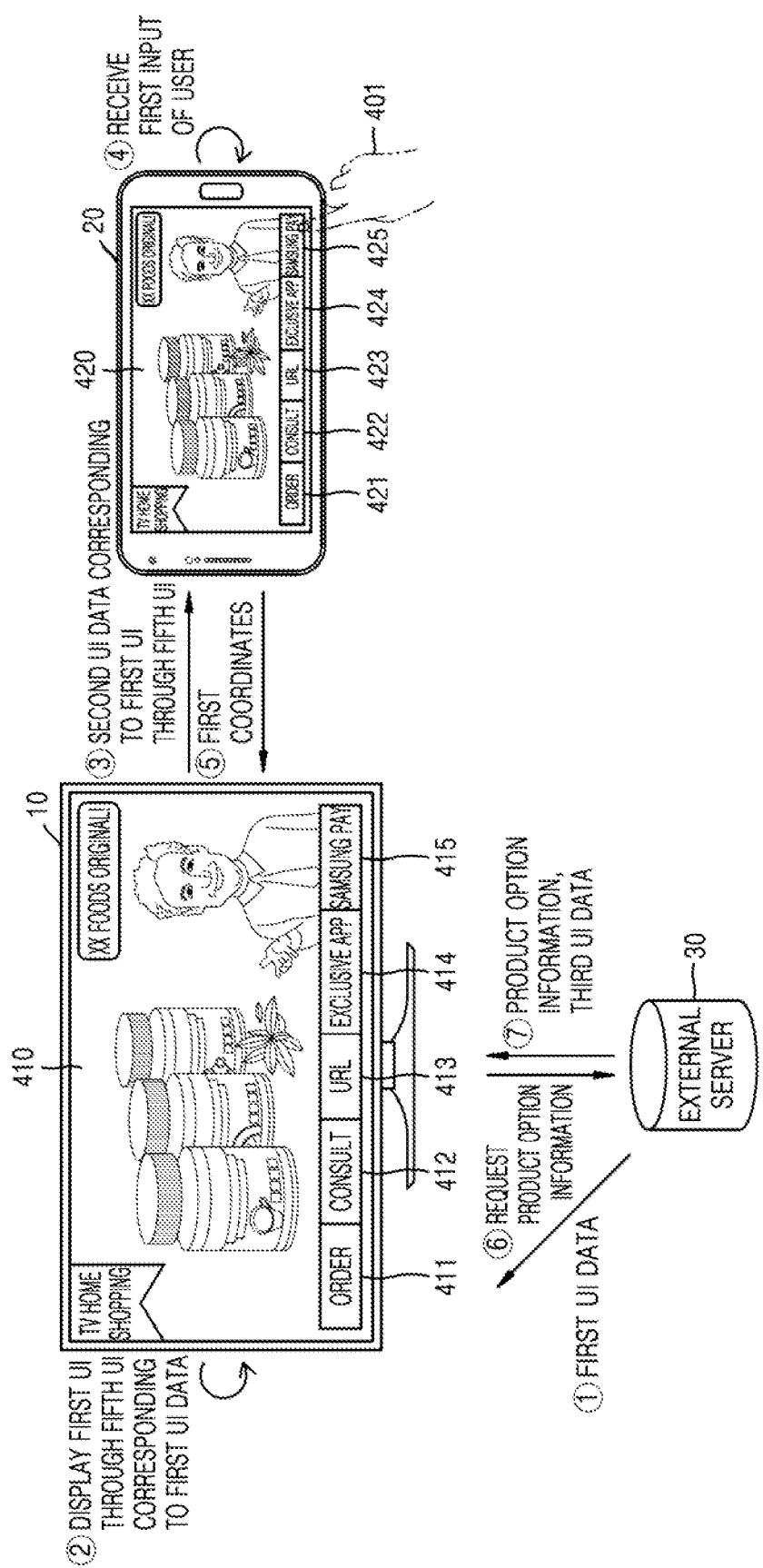

FIGS. 4A and 4B are diagrams for describing a process of controlling an external device by an electronic device to pay for a product, according to various embodiments of the present disclosure.

In FIG. 4A, when the electronic device 10 displays home shopping broadcasting on a screen 410, the electronic device 10 may receive first UI data from the external server 30 in operation (1). The electronic device 10 may display first through fifth UIs 411 through 415 corresponding to first UI data on the screen by rendering the first UI data, in operation (2). Herein, the first through fifth UIs 411 through 415 may correspond to the first through fifth UIs 211 through 215 of FIG. 2 and thus will not be redundantly described.

In this situation, the screen sharing service may be executed between the electronic device 10 and the external device 20. The electronic device 10 may transmit second UI data corresponding to the first through fifth UIs 411 through 415 to the external device 20 through the screen sharing channel, in operation (3).

The external device 20 having received the second UI data may display a screen 420 including first through fifth UIs 421 through 425 corresponding to the second UI data. Next, the external device 20 may receive a first input of the user to select the fifth UI 425 in operation (4). According to the first input of the user, the external device 20 may transmit first coordinates corresponding to a position selected by the user to the electronic device 10, in operation (5).

When the received coordinates correspond to the position of the fifth UI 425 displayed on the screen 410, the electronic device 10 may request product option information for payment to the external server 30 in operation (6) and obtain the product option information from the external server 30 in response to the request in operation (7). The product option information may include, for example, at least one of a type of the product, the number of products, or discount information of the product. The electronic device 10 may further obtain third UI data related to the product option information for displaying the product option information in operation (7).

In FIG. 4B, the electronic device 10 having received the product option information and the third UI data related to the product option information may render the third UI data and display a sixth UI 416 corresponding to the third UI data on the screen. The sixth UI 416 may include the received product option information.

In this case, a screen sharing service may be executed between the electronic device 10 and the external device 20. Thus, the electronic device 10 may transmit fourth UI data corresponding to the sixth UI 416 to the external device 20 through a screen sharing channel, in operation (9).

The external device 20 having received the fourth UI data may display the screen 420 including a sixth UI 426 corresponding to the fourth UI data. The external device 20 may receive a second input of the user to select an option of a product and a payment button 426-1, in operation (10). According to the second input of the user, the external device 20 may transmit second coordinates corresponding to a position selected by the user to the electronic device 10.

When the received coordinates correspond to a position of the payment button 416-1 of the sixth UI 416 displayed on the screen 410, the electronic device 10 may perform a payment function corresponding to the payment button 416-1. The electronic device 10 may transmit the identification information and a payment request command of the external device 20 to a payment server 40, in operation (11). The payment server 40 may be a server capable of paying for a product, for example, a Samsung Pay server, an LG Pay server, a Naver Pay server, etc. The identification information of the external device 20 may be information for distinguishing the external device 20 from other terminals or identifying the user of the external device 20, for example, a phone number, a unique number, a medium access control (MAC) address, etc., allocated to the external device 20.

The payment server 40 may transmit a payment approval request command to the external device 20 when the external device 20 is identified as a device capable of payment based on the identification information of the external device 20, in operation (12).

The external device 20 having received the payment approval request command may approve payment of the product. For example, the user may approve payment of the product according to a payment scheme through fingerprint recognition or a password. As the user approves payment, the external device 20 may transmit a payment approval command to the payment server 40, in operation (13). The payment server 40 having received the payment approval command may process completion of payment of the product and transmit a payment completion command to the external device 20.

Upon reception of the payment completion command, the external device 20 may transmit a payment completion message indicating completion of payment to the electronic device 10, in operation (14). The electronic device 10 having received the payment completion message may display a UI indicating completion of payment of the user or store and manage a user's payment history.

Figure 5A:
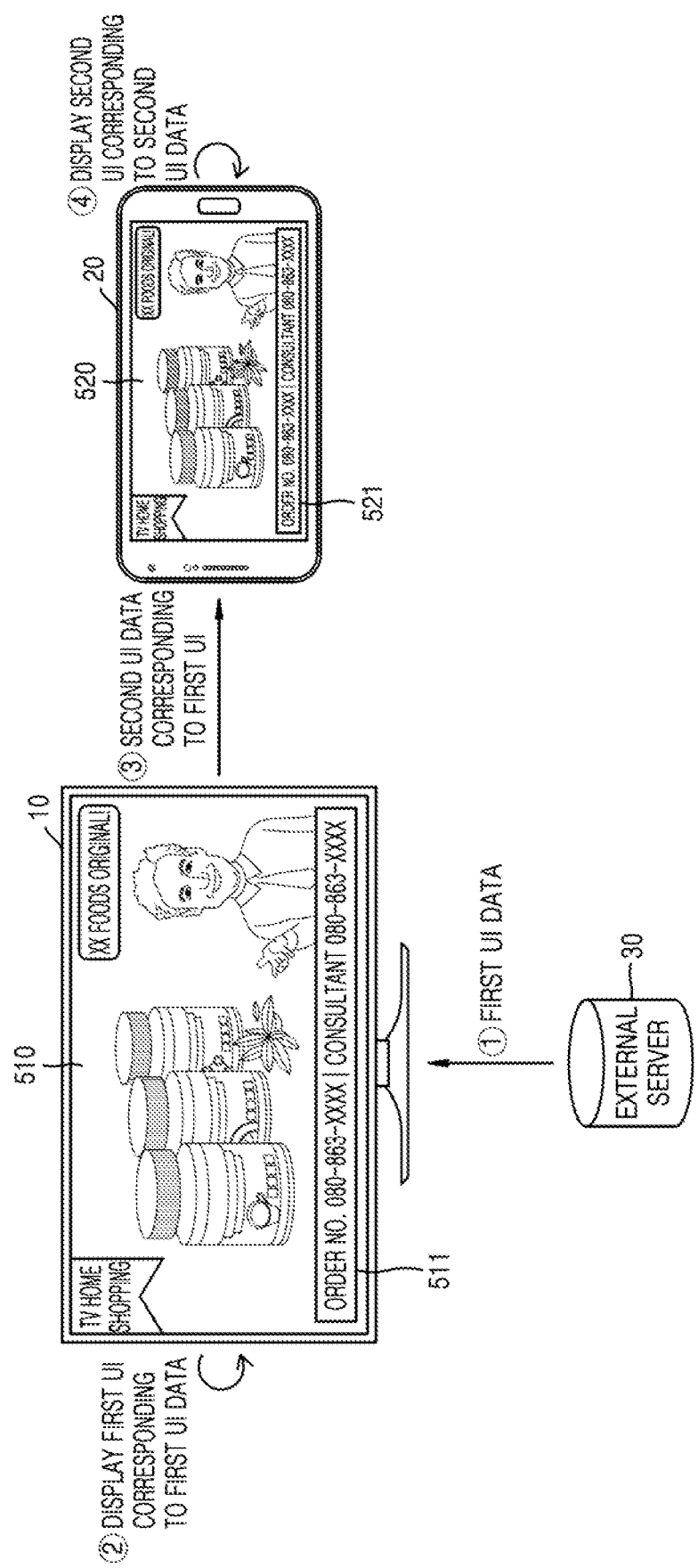
FIGS. 5A through 7B are diagrams for describing a process of providing user interface (UI) data to an external device by an electronic device, according to various embodiments of the present disclosure.
Figure 5B:
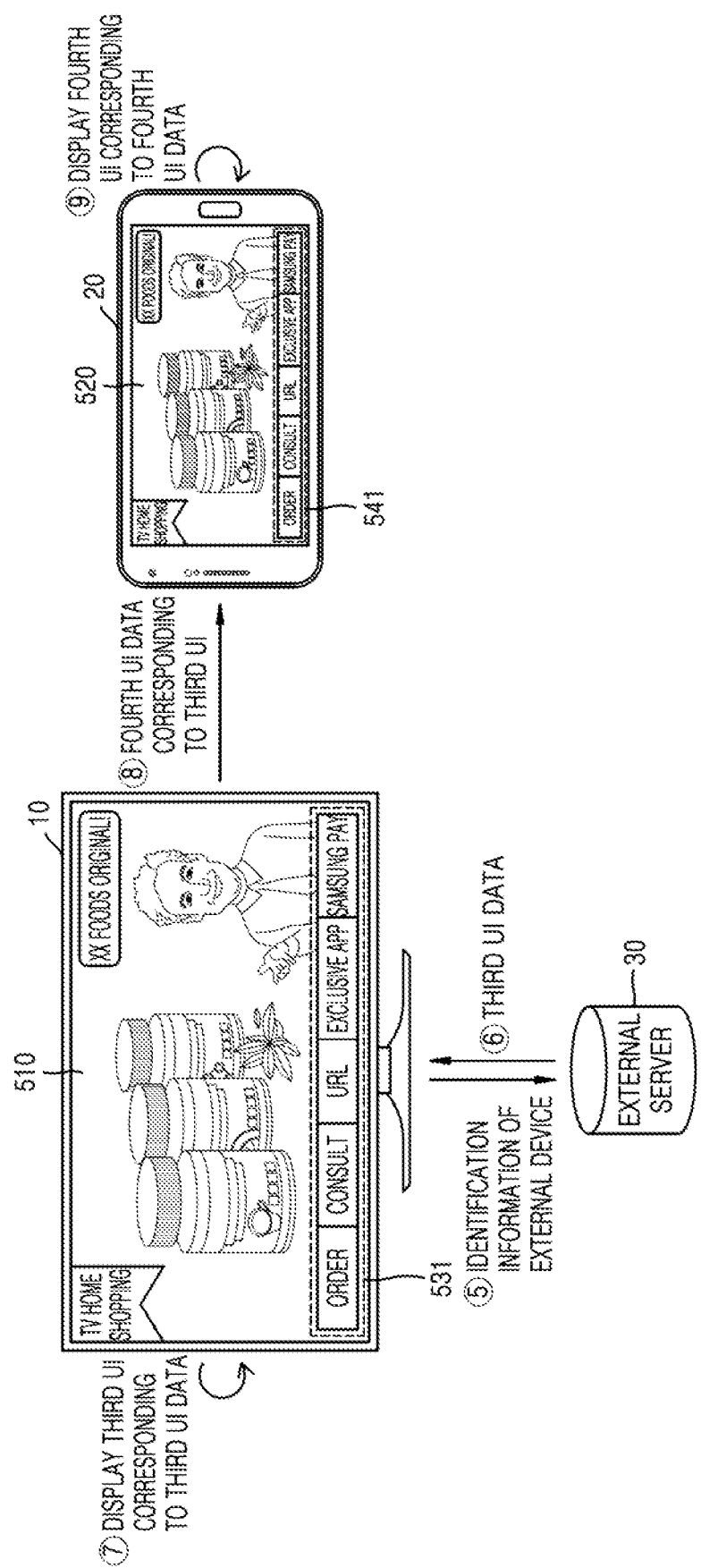

FIGS. 5A and 5B are diagrams for describing a process of providing user interface (UI) data to an external device by an electronic device, according to various embodiments of the present disclosure.

In FIG. 5A, when the electronic device 10 displays media contents (e.g., home shopping broadcasting) on a screen 510, the electronic device 10 may receive first UI data from the external server 30 in operation (1). The electronic device 10 may display a first UI 511 corresponding to first UI data on the screen 510 by rendering the received first UI data, in operation (2). In this case, the first UI data may be UI data reflecting the screen of the electronic device 10. The UI data reflecting the screen of the electronic device 10 may mean UI data that is found or generated based on at least one of a screen resolution or a screen size of the electronic device 10.

In this situation, the screen sharing service may be executed between the electronic device 10 and the external device 20. The electronic device 10 may transmit second UI data corresponding to the first UI 511 to the external device 20 through a screen sharing channel, in operation (3).

The external device 20 having received the second UI data may display a second UI 521 corresponding to the second UI data on the screen of the electronic device 10 by rendering the second UI data. In this case, the second UI data may be UI data received from the external server 30 based on the screen of the electronic device 10, and may not be appropriate for the screen of the external device 20. For example, the second UI 521 corresponding to the second UI data received from the electronic device 10 may be a UI that is displayed too small for the user to select, is displayed in a position at which a touch input is difficult to enter, or that is displayed in a position at which the UI collides with a previously provided basic UI of the electronic device 10.

Thus, when the screen sharing service is executed between the electronic device 10 and the external device 20, the electronic device 10 may transmit the identification information of the external device 20 that is sharing the screen with the electronic device 10 to the external server 30 in operation (5), as shown in FIG. 5B. The identification information of the external device 20 may be a device name, a manufacturing company, a unique number, etc., of the external device 20. The electronic device 10 may obtain the identification information of the external device 20 in a process of the external device 20 performing pairing connection for screen sharing.

The electronic device 10 may receive third UI data reflecting the screen of the external device 20 in response to the transmission, in operation (6). The UI data reflecting the screen of the external device 20 may mean UI data that is found or generated based on at least one of a screen resolution or a screen size of the external device 20, which has been found based on the identification information of the external device 20.

The electronic device 10 having received the third UI data may display a third UI 531 corresponding to the third UI data on the screen 510 by rendering the received third UI data, in operation (7). When the screen sharing service is executed between the electronic device 10 and the external device 20, the electronic device 10 may transmit fourth UI data corresponding to the third UI 531 to the external device 20 through the screen sharing channel, in operation (8).

The external device 20 may display a fourth UI 541 corresponding to the fourth UI data on a screen 520 by rendering the received fourth UI data, in operation (9).

Figure 6A:
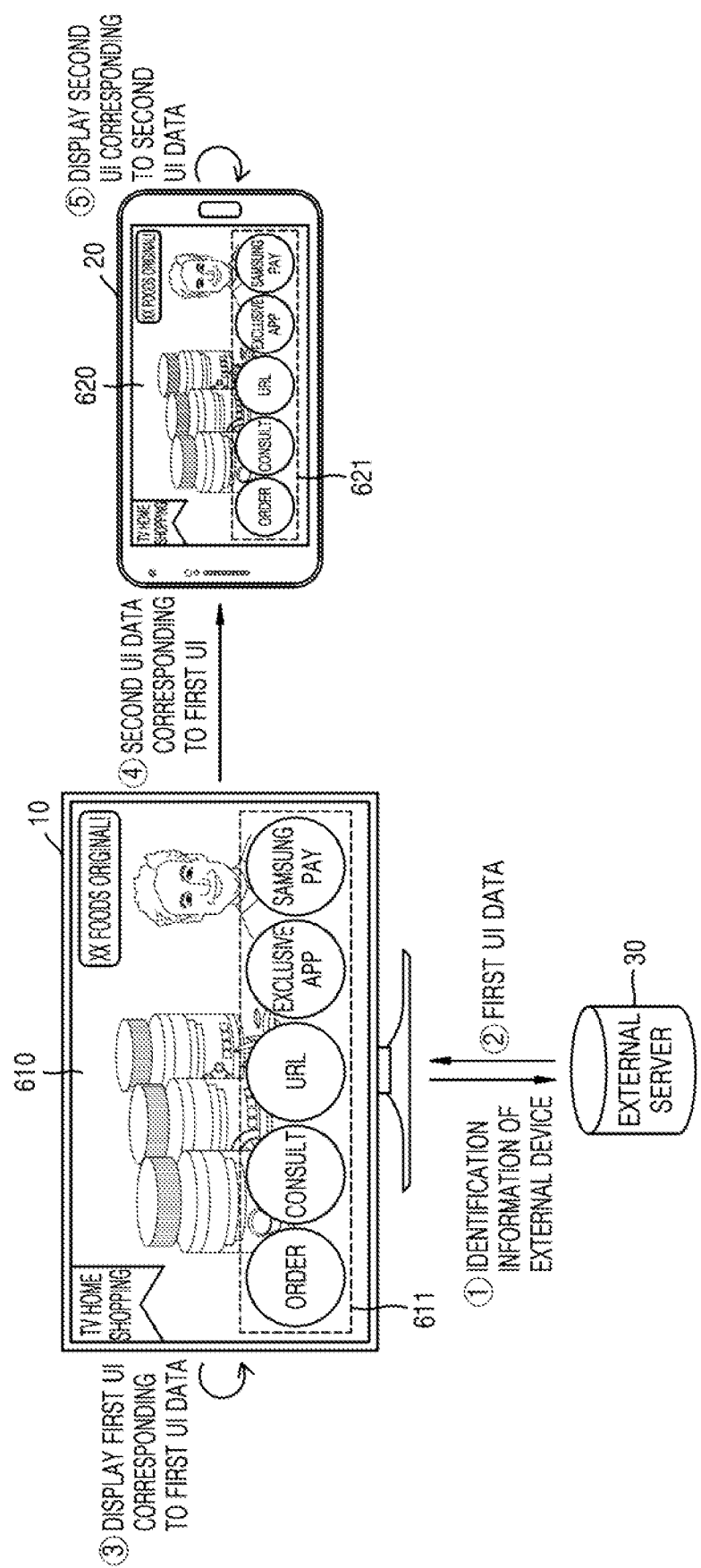
Figure 6B:
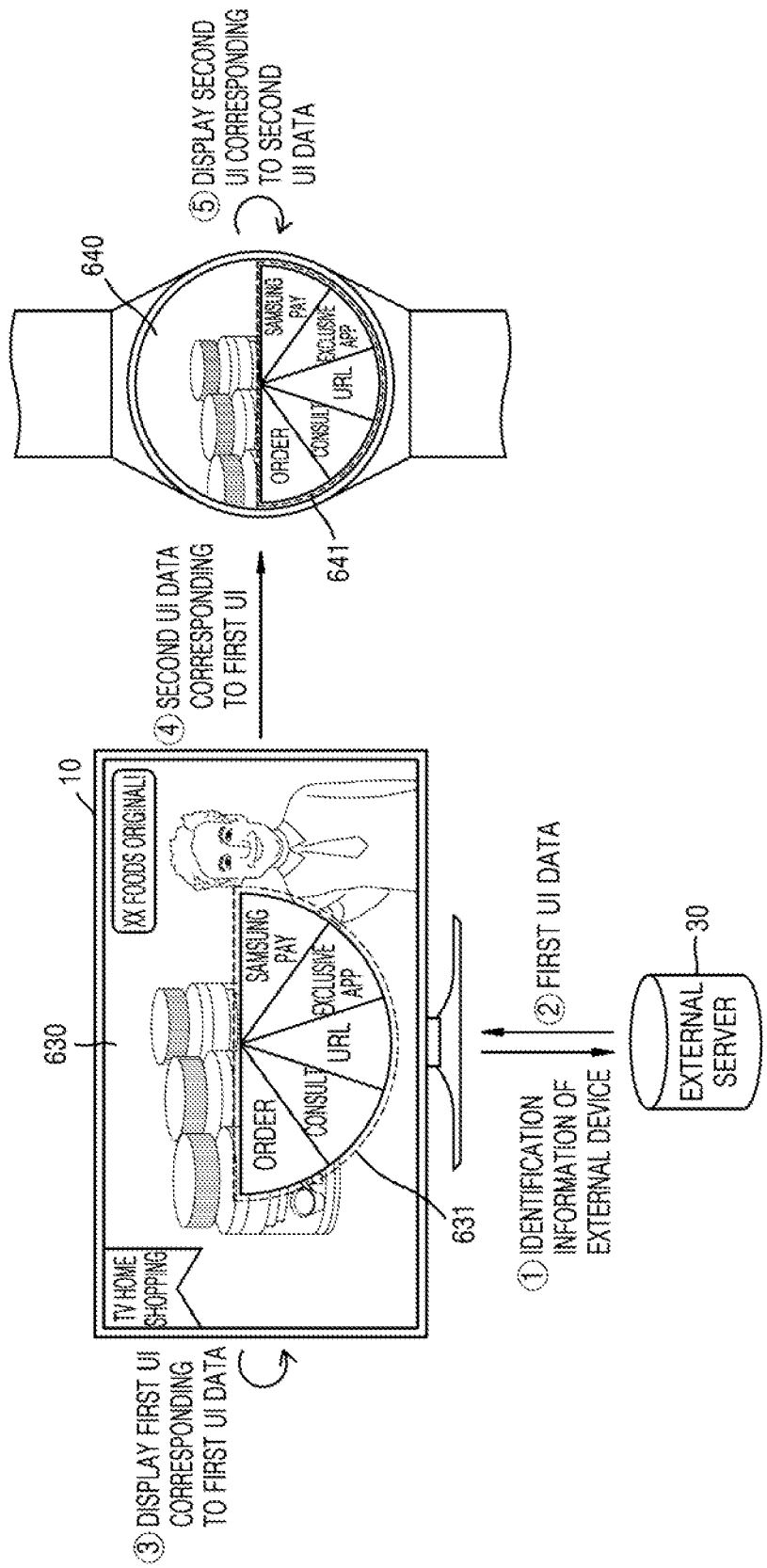

FIGS. 6A and 6B are diagrams for describing a process of providing UI data to an external device by an electronic device, according to another embodiment of the present disclosure.

Thus, in FIG. 6A, when the screen sharing service is executed between the electronic device 10 and the external device 20, the electronic device 10 may transmit the identification information of the external device 20 that is sharing the screen with the electronic device 10 to the external server 30 in operation (1). The external server 30 may transmit first UI data reflecting the screen of the external device 20 to the electronic device 10, in which the first UI data is found based on the received identification information, in operation (2). The electronic device 10 may display a first UI 611 corresponding to the first UI data on a screen 610, by rendering the received first UI data, in operation (3), and transmit second UI data corresponding to the first UI 611 to the external device 20 in operation (4). The external device 20 may display a second UI 621 corresponding to the second UI data on a screen 620, by rendering the received second UI data, in operation (5). In this case, the second UI 621 may be a UI in a form that is appropriate for a touch input of the user. For example, the second UI 621 may include objects with circular round corners, which are capable of being touched.

In another example, in FIG. 6B, when the screen sharing service is executed between the electronic device 10 and the external device 20, the electronic device 10 may transmit the identification information of the external device 20 that is sharing the screen with the electronic device 10 to the external server 30, in operation (1). The external device 20, which is a wearable device, may be Galaxy Gear with a circular screen, etc., for example. The external server 30 may transmit first UI data reflecting a circular screen of the external device 20 to the electronic device 10, in which the first UI data is found based on the received identification information, in operation (2). The electronic device 10 may display a first UI 631 corresponding to the first UI data on a screen 630, by rendering the received first UI data, in operation (3), and transmit second UI data corresponding to the first UI 631 to the external device 20 in operation (4). The external device 20 may display a second UI 641 corresponding to the second UI data on a screen 640, by rendering the received second UI data, in operation (5). In this case, the second UI 641 may be a UI in a form that is appropriate for a touch input of the user on a circular screen. For example, the second UI 641 may include a UI in a semicircular or fan-shaped form as a UI corresponding to the circular screen of the external device 20.

Figure 7A:
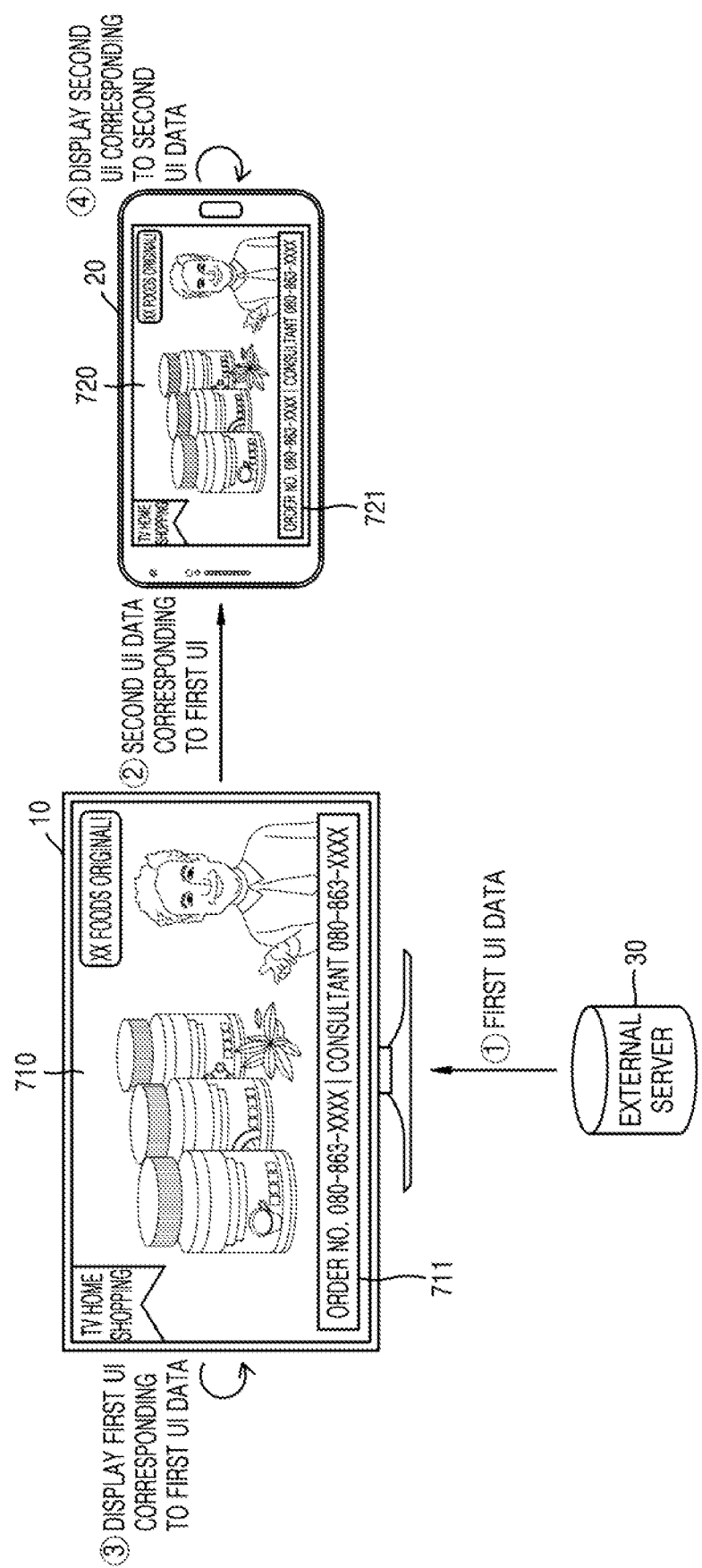
Figure 7B:
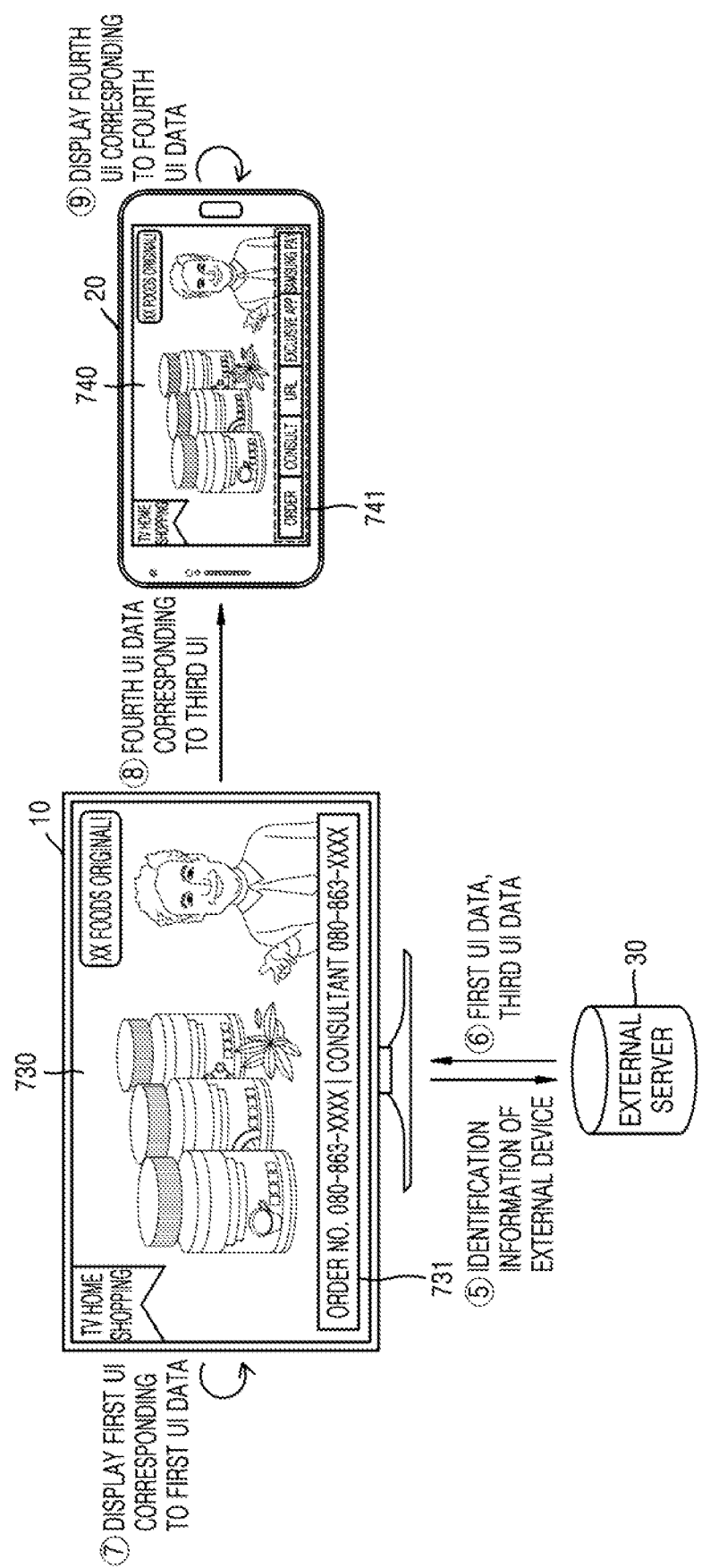

FIGS. 7A and 7B are diagrams for describing a process of providing UI data to an external device by an electronic device, according to another embodiment of the present disclosure.

In FIG. 7A, when the electronic device 10 displays media contents (e.g., home shopping broadcasting) on a screen 710, the electronic device 10 may receive first UI data from the external server 30 in operation (1). The electronic device 10 may display a first UI 711 corresponding to first UI data on the screen 710 by rendering the received first UI data, in operation (2). In this situation, the screen sharing service may be executed between the electronic device 10 and the external device 20. The electronic device 10 may transmit second UI data corresponding to the first UI 711 to the external device 20 through a screen sharing channel, in operation (3). The external device 20 having received the second UI data may display a second UI 721 corresponding to the second UI data on the screen of the electronic device 10 by rendering the second UI data.

When the screen sharing service is executed between the electronic device 10 and the external device 20, the electronic device 10 may transmit the identification information of the external device 20 connected with the external server 30 in operation (5), as shown in FIG. 7B. The electronic device 10 may receive third UI data reflecting the screen of the external device 20 in response to the transmission, in operation (6). The electronic device 10 may further receive the first UI data reflecting the screen of the electronic device 10, in operation (6). The first UI data may be the received UI data in FIG. 7A or updated UI data of the first UI data.

The electronic device 10 having received the first UI data may display a first UI 731 corresponding to the first UI data on a screen 730 by rendering the received first UI data, in operation (7). The electronic device 10 may transmit fourth UI data corresponding to the third UI data received from the external server 30 to the external device 20 through a screen sharing channel, in operation (8). The fourth UI data may be the same data as the third UI data or may be data having a different communication format. For example, the third UI data may be data generated according to a remote communication protocol, and the fourth UI data may be data generated according to a short-range communication protocol.

The external device 20 may display a fourth UI 741 corresponding to the fourth UI data on a screen 720 by rendering the received fourth UI data, in operation (9).

Figure 8:
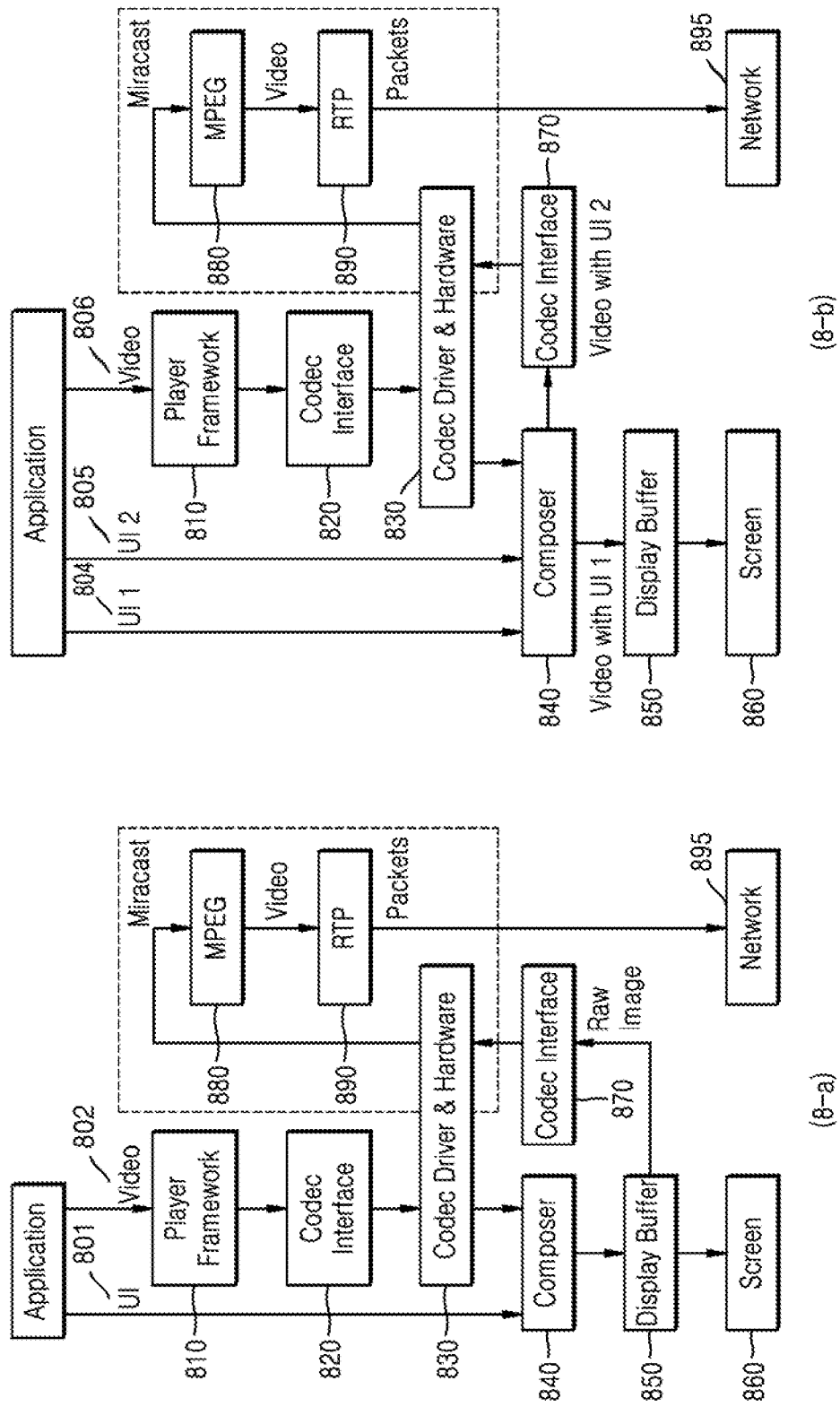
FIG. 8 is a UI data processing block diagram of an electronic device according to an embodiment of the present disclosure.

FIG. 8 is a UI data processing block diagram of the electronic device 10 according to an embodiment of the present disclosure.

FIG. 8 illustrates a situation where the electronic device 10 and the external device 20 share a screen therebetween.

In this case, (8-a) of FIG. 8 is a block diagram of a part of the electronic device 10 that transmits UI data according to a process of FIGS. 5A and 5B, and (8-b) of FIG. 8 is a block diagram of a part of the electronic device 10 that transmits UI data according to a process of FIGS. 7A and 7B.

In (8-a) of FIG. 8, the electronic device 10 may obtain UI data 801 from the external server 30 and obtain video data 802 from the external server 30 or a broadcasting server (not shown). The UI data 801 obtained from the external server 30 may be UI data selected based on screen information of the external device 20. For example, when the electronic device 10 transmits identification information of the external device 20 to the external server 30, the external server 30 may obtain screen information such as a screen resolution and a screen size of the external device 20 based on the identification information of the external device 20. The external server 30 may search for or generate UI data reflecting the screen information and transmit the UI data to the electronic device 10.

In (8-a) of FIG. 8, the electronic device 10 may provide the obtained UI data 801 to a screen composer 840, and decode the video data 802 through a player framework 810, a codec interface 820, and a codec driver/hardware 830 and provide a decoding result to the screen composer 840. The electronic device 10 may store generated screen data in a display buffer 850 through the screen composer 840 and display the screen data on a screen 860. Meanwhile, to share a screen with the external device 20, the electronic device 10 may encode the screen data stored in the display buffer 850 through a codec interface 870, the codec driver/hardware 830, and a codec module 880 and transmit a communication packet generated through a real time protocol (RTP) module 890 to the external device 20 over a network 895.

Thus, a UI that is the same as a UI corresponding to the UI data 801 displayed on the screen of the electronic device 10 may be displayed on the screen of the external device 20 which shares the screen with the electronic device 10.

In another example, in (8-b) of FIG. 8, the electronic device 10 may obtain first UI data 804 and second UI data 805 from the external server 30 and obtain video data 806 from the external server 30 or a broadcasting server (not shown). The first UI data 804 may be data obtained from the external server 30 based on the screen of the electronic device 10, and the second UI data 805 may be data obtained from the external server 30 based on the screen of the external device 20.

The electronic device 10 may provide the obtained first UI data 804 and second UI data 805 to the screen composer 840, and decode the video data 806 through the player framework 810, the codec interface 802, and the codec driver/hardware 830 and provide a decoding result to the screen composer 840. The electronic device 10 may transmit screen data generated from the first UI data 804 and the video data 806 to the display buffer 850 and screen data generated from the second UI data 805 and the video data 806 to the codec interface 870, through the screen composer 840. The electronic device 10 may display the screen data provided to the display buffer 850 through the screen 860. The electronic device 10 may encode the screen data provided to the codec interface 870 through the codec driver/hardware 830 and the codec module 880 and transmit the communication packet generated through the RTP module 890 to the network 895.

In this case, a UI that is different from a UI displayed on the screen of the electronic device 10 may be displayed on the screen of the external device 20 which shares the screen with the electronic device 10. That is, a UI appropriate for the screen of the electronic device 10 and a UI appropriate for the screen of the external device 20 may be independently provided, such that an optimal user manipulation environment may be provided for each of a situation where the user manipulates the electronic device 10 and a situation where the user manipulates the external device 20.

According to various embodiments, when the UI displayed on the screen of the electronic device 10 and the UI displayed on the screen of the external device 20 are different from each other, a mapping table for connection between the two UIs needs to exist. For example, the UI displayed on the screen of the electronic device 10 and the UI displayed on the screen of the external device 20 may be UIs for performing the same function. In this case, there may be a mapping table for mapping coordinates of the UI displayed on the screen of the external device 20 or coordinates of objects included in the UI to coordinates of the UI displayed on the screen of the electronic device 10 or coordinates of objects included in the UI, based on the forms of the two UIs being different from each other. The mapping table may be received, for example, together with the first UI data 804 and the second UI data 805, from the external server 30.

Figure 9:
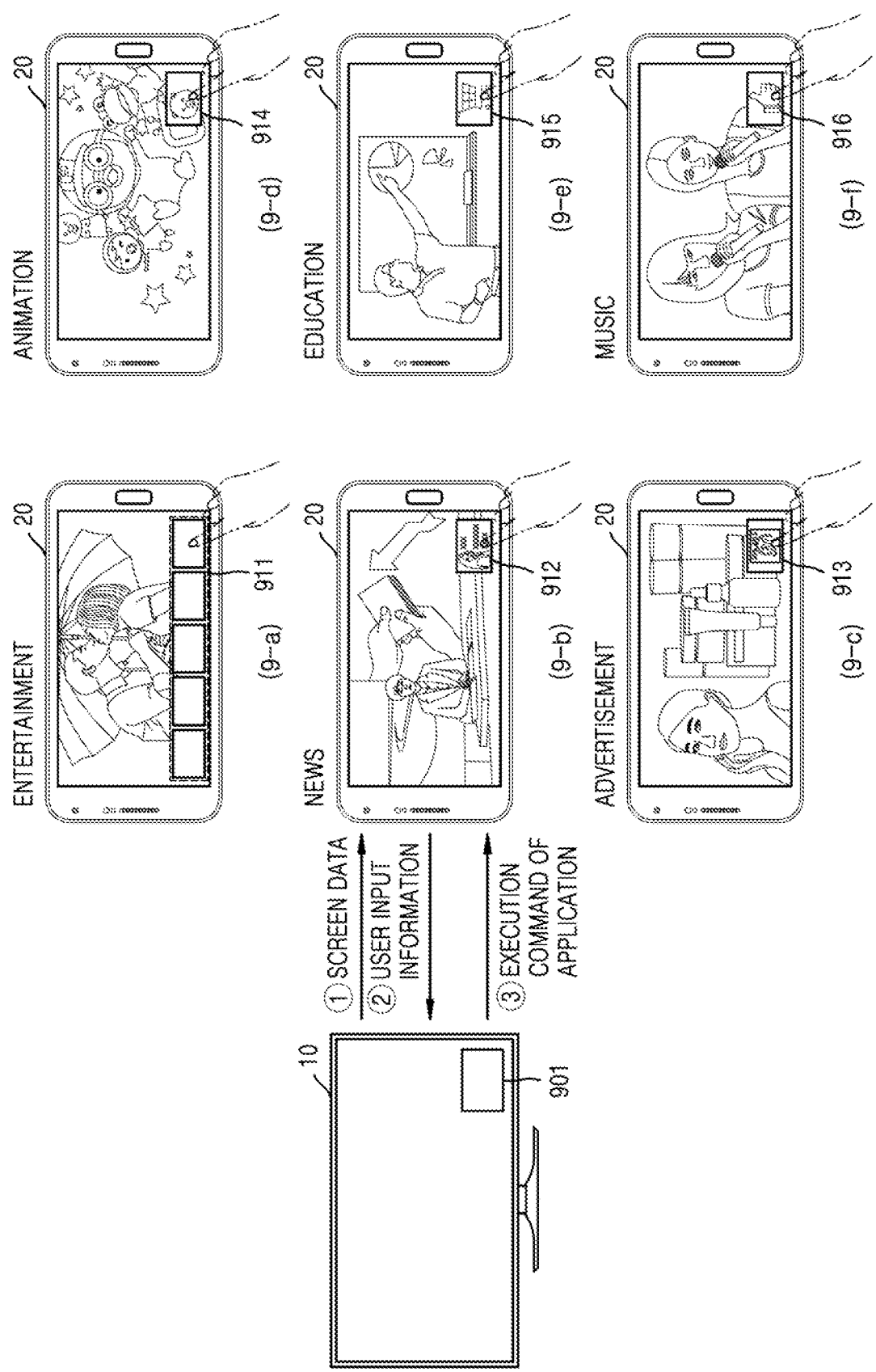
FIGS. 9 and 10 are diagrams for describing a process of interaction between an electronic device and an external device, according to an embodiment of the present disclosure.

FIG. 9 is a diagram for describing a process of interaction between an electronic device and an external device, according to an embodiment of the present disclosure.

In FIG. 9, the electronic device 10 may provide various contents. For example, the electronic device 10 may provide entertainment contents, news contents, advertisement contents, animation contents, education contents, music contents, etc.

As the screen sharing service is executed between the electronic device 10 and the external device 20, the electronic device 10 may transmit screen data to the external device 20 through the screen sharing channel, in operation (1). The screen data may include, for example, UI data corresponding to a UI 901 being displayed on the screen of the electronic device 10 or UI data appropriate for the screen of the external device 20. In this case, the UI data may be UI data provided by a contents provider. The external device 20 may transmit user input information executed by the user to the electronic device 10 in response to a user input to select the UI displayed on the screen, which corresponds to the UI data. The user input information may include, for example, at least one of coordinates at which the user touches the screen, a touch duration in which the touch continues, a drag speed, a drag direction, a drag acceleration, multi-touch coordinates, or a multi-touch direction.

The electronic device 10 having received the user input information may perform a function corresponding to the user input. For example, the electronic device 10 may transmit an execution command of an application corresponding to the user input to the external device 20, in operation (3).

As shown in (9-*a*) of FIG. 9, the external device 20 may display a menu (e.g., a thumbnail list) 911 related to the entertainment contents as the UI corresponding to the UI data received from the electronic device 10. In this case, in response to the user input to select an object (e.g., a thumbnail) of the menu 911, the external device 20 may transmit the user input information to the electronic device 10. The electronic device 10 may display a thumbnail (e.g., a highlight scene of a drama, etc.)-related screen and share the thumbnail-related screen with the external device 20.

In another example, as shown in (9-*b*) of FIG. 9, the external device 20 may display a menu 912 related to the news contents as the UI corresponding to the UI data received from the electronic device 10. In this case, in response to the user input to touch the menu 912, the external device 20 may transmit the user input information to the electronic device 10. The electronic device 10 may transmit an execution command of an application accessing an article link related to the news contents to the external device 20, as a function corresponding to the received user input information.

In another example, as shown in (9-*c*) of FIG. 9, the external device 20 may display a menu 913 related to the news contents as the UI corresponding to the UI data received from the electronic device 10. In this case, in response to the user input to touch the menu 913, the external device 20 may transmit the user input information to the electronic device 10. The electronic device 10 may transmit an execution command of an application accessing an advertisement link (e.g., a coupon providing homepage link) related to the advertisement contents to the external device 20, as a function corresponding to the received user input information.

In another example, as shown in (9-*d*) of FIG. 9, the external device 20 may display a menu 914 related to the animation contents as the UI corresponding to the UI data received from the electronic device 10. In this case, in response to the user input to touch the menu 914, the external device 20 may transmit the user input information to the electronic device 10. The electronic device 10 may transmit an execution command of a character product purchase application related to the animation contents to the external device 20, as a function corresponding to the received user input information.

In another example, as shown in (9-*e*) of FIG. 9, the external device 20 may display a menu 915 related to the education contents as the UI corresponding to the UI data received from the electronic device 10. In this case, in response to the user input to touch the menu 915, the external device 20 may transmit the user input information to the electronic device 10. The electronic device 10 may transmit an execution command of an education product purchase application related to the education contents to the external device 20, as a function corresponding to the received user input information.

In another example, as shown in (9-*e*) of FIG. 9, the external device 20 may display a menu 916 related to the music contents as the UI corresponding to the UI data received from the electronic device 10. In this case, in response to the user input to touch the menu 916, the external device 20 may transmit the user input information to the electronic device 10. The electronic device 10 may transmit an execution command of an application accessing a site for voting or rating contents related to the music contents to the external device 20, as a function corresponding to the received user input information.

According to FIG. 9, the external device 20 may intuitively manipulate the electronic device 10 by using a user input (e.g., a touch input, a scroll input, a long press input, etc.) entered using a touch sensor. Moreover, an additional function of contents displayed in the electronic device 10 may be performed in the external device 20, thus improving user convenience.

Figure 10:
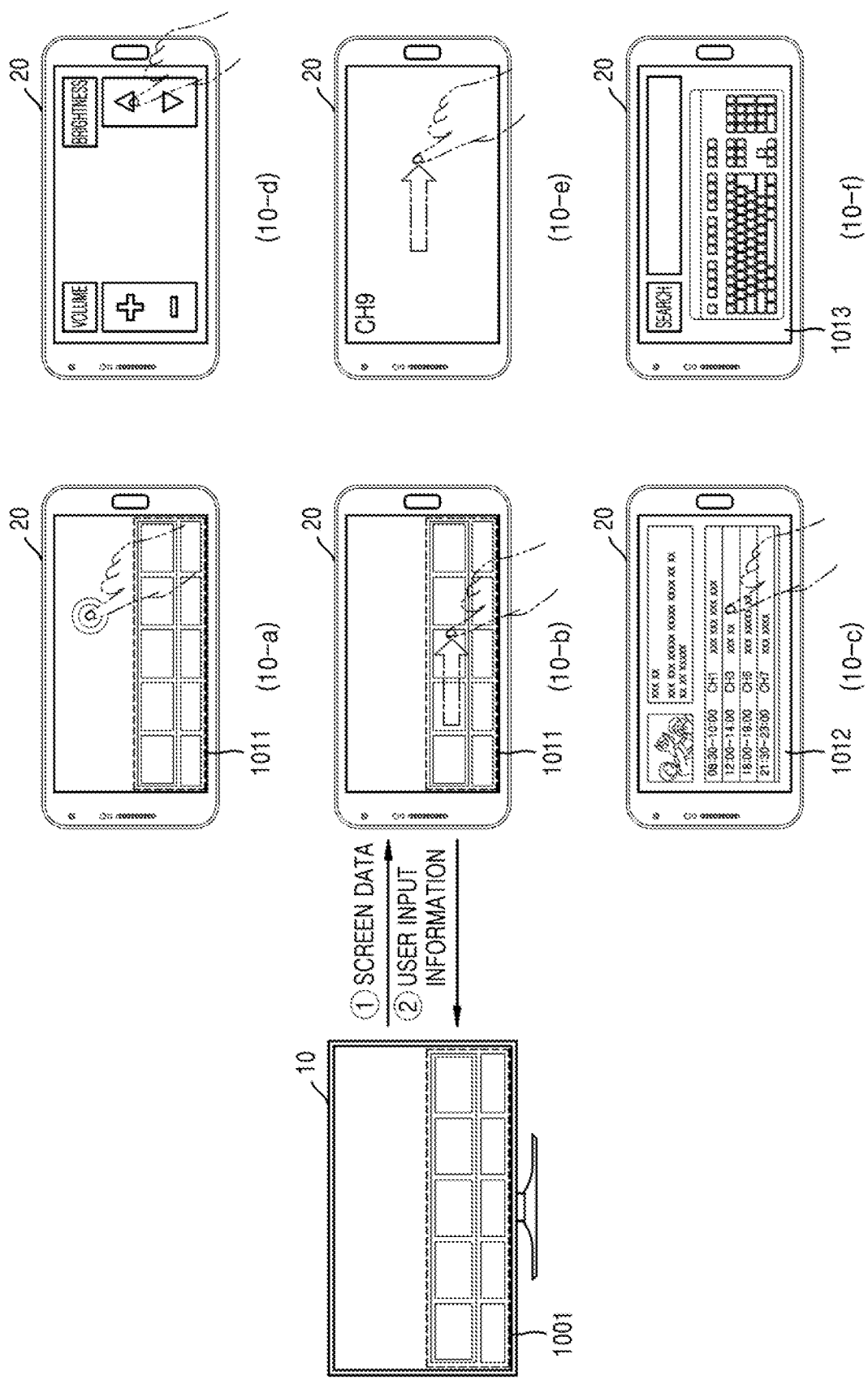

FIG. 10 is a diagram for describing a process of interaction between an electronic device and an external device, according to an embodiment of the present disclosure.

In FIG. 10, as the screen sharing service is executed between the electronic device 10 and the external device 20, the electronic device 10 may transmit screen data to the external device 20 through the screen sharing channel, in operation (1). The screen data may include, for example, UI data corresponding to a UI 1001 being displayed on the screen of the electronic device 10 or UI data appropriate for the screen of the external device 20. In this case, the UI data, which is intended for controlling a unique function of the electronic device 10, may be UI data provided by the electronic device 10. The external device 20 may transmit user input information executed by the user to the electronic device 10 in response to a user input to select the UI displayed on the screen, which corresponds to the UI data.

For example, as shown in (10-*a*) of FIG. 10, the external device 20 may display an on-screen display (OSD) UI 1011 as the UI corresponding to the UI data received from the electronic device 10. The OSD UI may include, for example, at least one of volume information, menu information, channel information, program table information, or search information. In this case, in response to the user input to press the screen of the external device 20 long, the external device 20 may transmit the user input information to the electronic device 10. The electronic device 10 may turn off or on the OSD UI 1011 being displayed on the electronic device 10 as a function corresponding to the received user input information.

In another example, as shown in (10-*b*) of FIG. 10, the external device 20 may display the OSD UI 1011 as the UI corresponding to the UI data received from the electronic device 10. In this case, in response to the user input to select or scroll at least one object included in the OSD UI 1011, the external device 20 may transmit the user input information to the electronic device 10. The electronic device 10 may scroll and display the selected object, display information related to the selected object, and share a display result with the external device 20 as the function corresponding to the received user input information.

In another example, as shown in (10-*c*) of FIG. 10, the external device 20 may display an electric program guide (EPG) UI 1012 as the UI corresponding to the UI data received from the electronic device 10. In this case, in response to the user input to zoom in/out the EPG UI 1012 or select an object (e.g., a program table, a broadcasting thumbnail, etc.) included in the EPG UI 1012, the external device 20 may transmit the user input information to the electronic device 10. The electronic device 10 may zoom in/out the EPG UI 1012 or display information related to the object included in the EPG UI 1012 and share a display result with the external device 20, as the function corresponding to the received user input information.

In another example, as shown in (10-d) of FIG. 10, in response to the user input to drag a side of the screen of the external device 20 upward or downward, the external device 20 may transmit the user input information to the electronic device 10. The electronic device 10 may adjust the volume of the screen of the electronic device 10 or the brightness of the screen, as a function corresponding to the received user input information.

In another example, as shown in (10-e) of FIG. 10, in response to the user input to drag the screen of the external device 20 to the left or to the right, the external device 20 may transmit the user input information to the electronic device 10. The electronic device 10 may change a channel being broadcast, as a function corresponding to the received user input information.

In another example, as shown in (10-f) of FIG. 10, a virtual keypad 1013 may be displayed on the screen of the external device 20. For example, in response to the user input to drag from a side of the screen to the center of the screen, the virtual keypad 1013 may be displayed on the screen of the external device 20. In response to the user input to input a search word through the virtual keypad 1013, the external device 20 may transmit the user input information to the electronic device 10. The electronic device 10 may transmit an execution command of an application for displaying information related to the search word to the external device 20, as a function corresponding to the received user input information.

According to FIG. 10, a unique function of the electronic device 10 may be controlled through the external device 20, and user's intuition for controlling the electronic device 10 may be improved.

Figure 11:
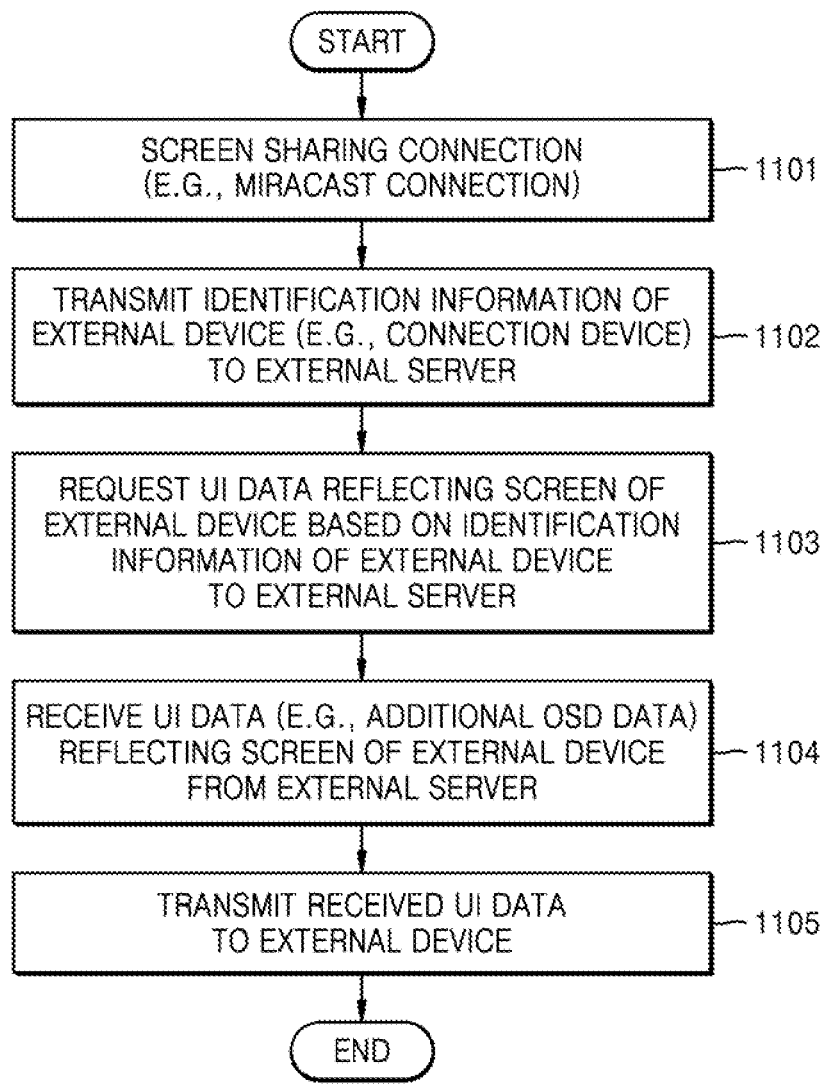
FIGS. 11 and 12 are flowcharts illustrating a process of providing UI data to an external device by an electronic device, according to various embodiments of the present disclosure.

FIG. 11 is a flowchart illustrating a process of providing UI data to an external device by an electronic device, according to various embodiments of the present disclosure.

First, screen sharing connection (e.g., miracast connection) may be performed between the electronic device 10 and the external device 20, in operation 1101. For example, the screen displayed on the electronic device 10 may be displayed on the display of the external device 20.

When screen sharing connection is performed between the electronic device 10 and the external device 20, the electronic device 10 may transmit identification information of the external device 20 (e.g., a connection device) to the external server 30, in operation 1102.

The electronic device 10 may request UI data based on the screen of the external device 20 reflecting the identification information of the external device 20 to the external server 30, in operation 1103.

The electronic device 10 may receive the UI data (e.g., additional OSD data) reflecting the screen of the external device 20 from the external server 30, in operation 1104.

The electronic device 10 may transmit the received UI data to the external device 20 in operation 1105. For example, the electronic device 10 may transmit screen data obtained by combining the received UI data with video data displayed on the electronic device 10 to the external device 20.

Figure 12:
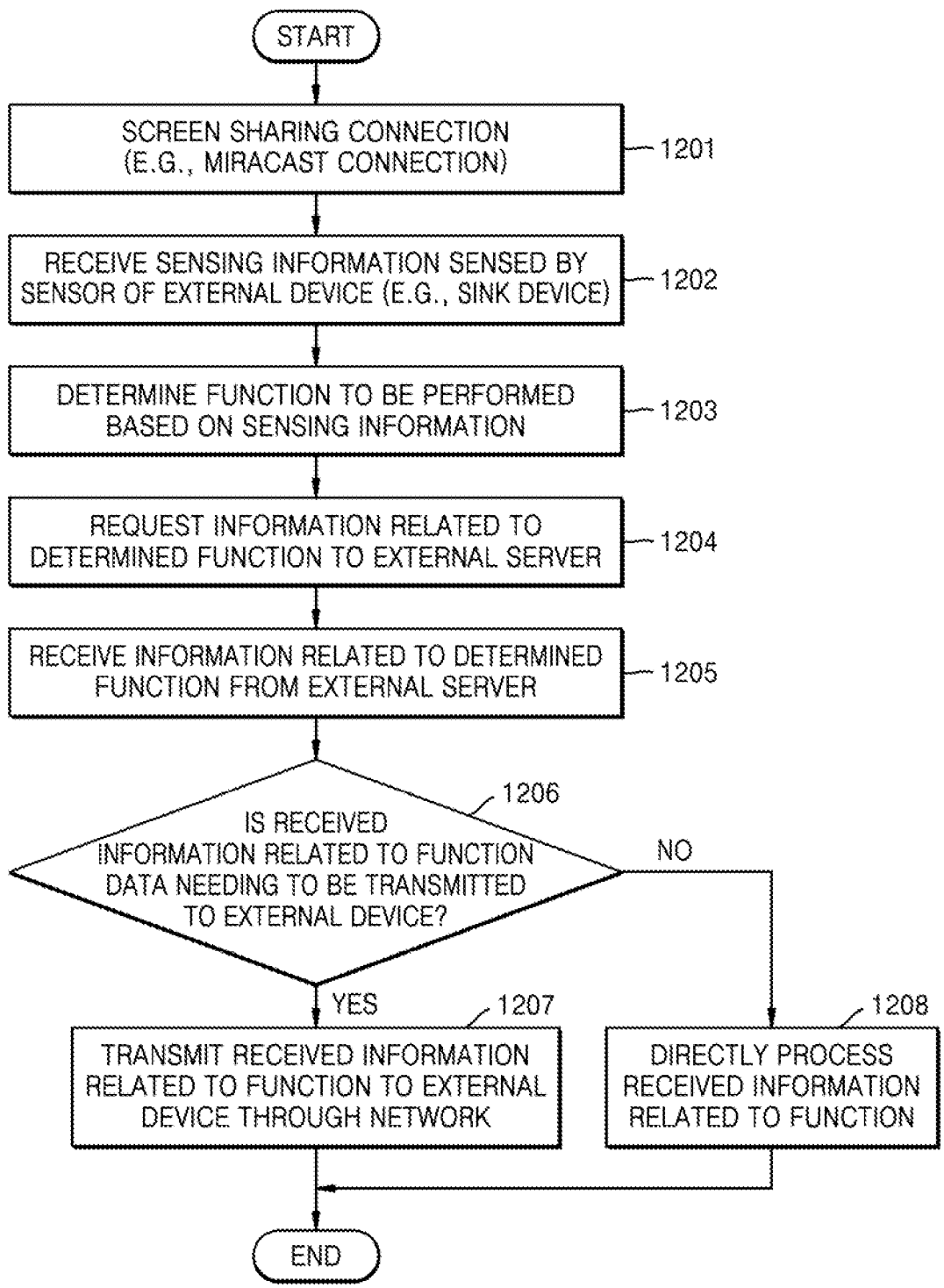

FIG. 12 is a flowchart illustrating a process of providing UI data to an external device by an electronic device, according to various embodiments of the present disclosure.

First, screen sharing connection (e.g., miracast connection) may be performed between the electronic device 10 and the external device 20, in operation 1201.

The electronic device 10 may receive sensing information (e.g., touch coordinates of the user) sensed by a sensor (e.g., a touch panel) of a connected external device (e.g., a sink device) in operation 1202.

Upon reception of the sensing information, the electronic device 10 may determine a function to be performed based on the sensed sensing information (e.g., the touch coordinates), in operation 1203. For example, the electronic device 10 may determine to perform a function related to payment as a function related to a UI corresponding to the touch coordinates, based on the touch coordinates corresponding to a position selected by the user.

When the function to be performed is determined based on the sensed sensing information, the electronic device 10 may request information related to the determined function to the external server 30, in operation 1204. For example, the electronic device 10 may request product option information for payment to the external server 30.

In response to the request, the electronic device 10 may receive the information related to the determined function from the external server 30, in operation 1205.

The electronic device 10 may determine whether the received information related to the function is data needing to be transmitted to the external device (e.g., the sink device) 20. When the electronic device 10 determines that the information is data needing to be transmitted (yes in operation 1206), the electronic device 10 may transmit the received information related to the function to the external device 20, in operation 1207. For example, when the received information related to the function is product option information and UI data related thereto, the electronic device 10 may transmit the product option information and the UI data to the external device 20.

On the other hand, when the electronic device 10 determines that the information is data not needing to be transmitted to the external device 20 (no in operation 1206), the electronic device (e.g., a source device) 10 may directly process the received information related to the function, in operation 1208.

Figure 13:
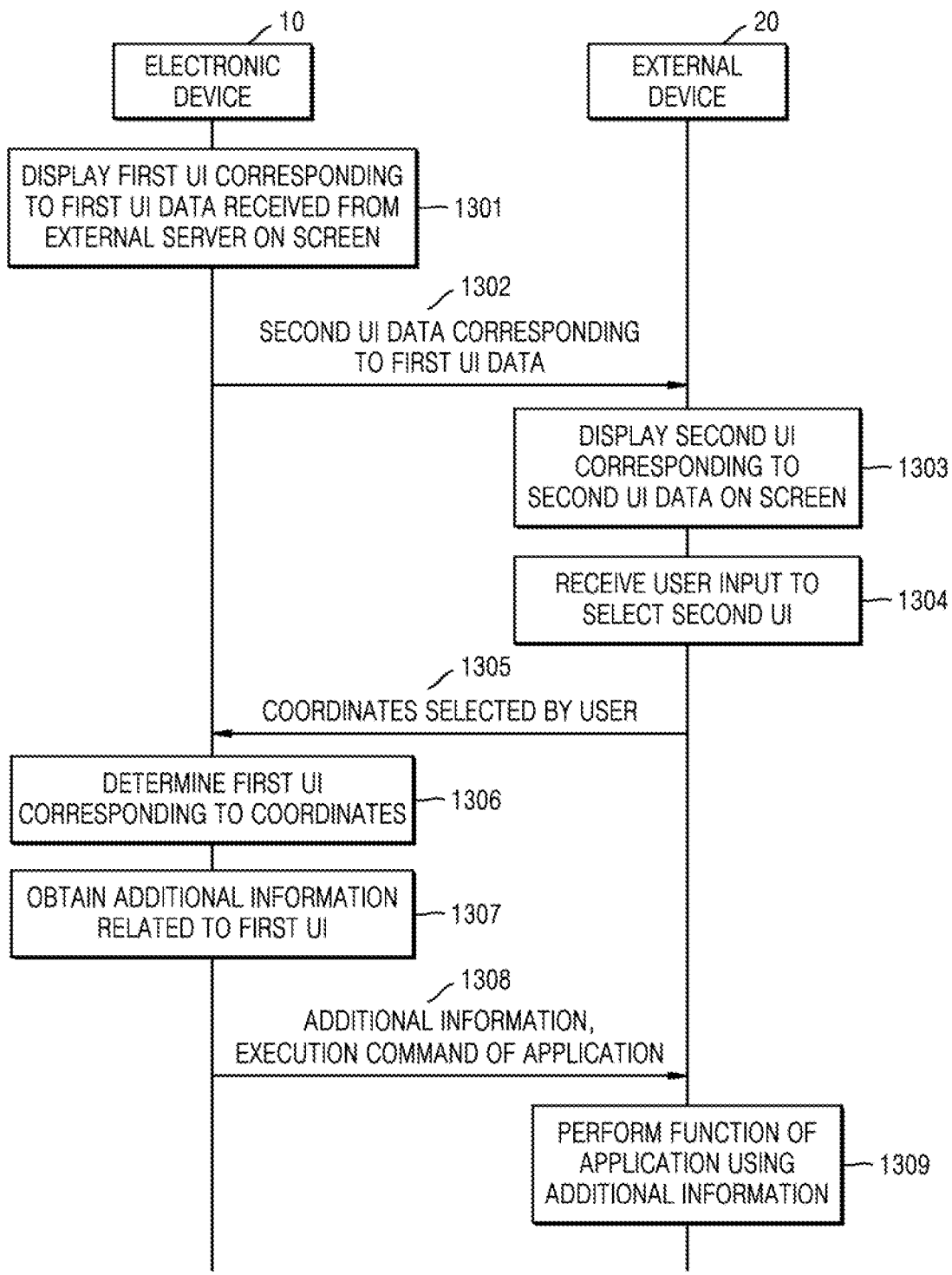
FIG. 13 is a flowchart illustrating a process of transmitting and receiving data between an electronic device and an external device, according to various embodiments of the present disclosure.

FIG. 13 is a flowchart illustrating a process of transmitting and receiving data between an electronic device and an external device, according to various embodiments of the present disclosure.

First, the electronic device 10 may display a first UI corresponding to first UI data received from the external server 30 on a screen, in operation 1301. In this case, the first UI data may be data generated according to a remote communication protocol.

The electronic device 10 may transmit second UI data corresponding to the first UI to the external device 20, in operation 1302. In this case, the second UI data may be data generated according to a short-range communication protocol. The electronic device 10 may transmit the second UI data through the screen sharing channel. The electronic device 10 may transmit video data being displayed on the screen, together with the second UI data, to the external device 20.

The external device 20 may display a second UI corresponding to the second UI data on the screen, in operation 1303.

Upon reception of a user input to select the second UI displayed on the screen in operation 1304, the external device 20 may transmit coordinates selected by the user to the electronic device 10, in operation 1305. For example, the external device 20 may transmit the coordinates to the electronic device 10 through a UIBC.

When the first UI corresponding to the received coordinates is determined in operation 1306, the electronic device 10 may obtain additional information related to the first UI, in operation 1307. For example, the electronic device 10 may identify coordinates on the screen of the electronic device 10, which correspond to the received coordinates. When the identified coordinates correspond to the position of the first UI displayed on the screen of the electronic device 10, the electronic device 10 may obtain the additional information related to the first UI.

The electronic device 20 may transmit the obtained additional information and an execution command of an application using the additional information to the external device 20, in operation 1308. For example, when the additional information includes contact information, the execution command of the application may include an execution command of a phone application, an execution command of an e-mail application, or an execution command of a messenger application. When the additional information includes payment information, the execution command of the application may include an execution command of the payment application. The electronic device 10 may obtain the additional information from the memory of the electronic device 10 or the external server 30.

According to various embodiments, the electronic device 10 may transmit identification information of the external device 20 to the external server 30. The identification information of the external device 20 may include identification information obtained by the electronic device 10 in the screen sharing connection procedure with the external device 20. The electronic device 10 may receive third UI data reflecting the screen of the external device 20 from the external server 30 in response to transmission of the identification information. The electronic device 10 may transmit fourth UI data corresponding to the received third UI to the external device 20. The external device 20 may display a third UI corresponding to the fourth UI data on the screen by rendering the received fourth UI data.

Figure 14:
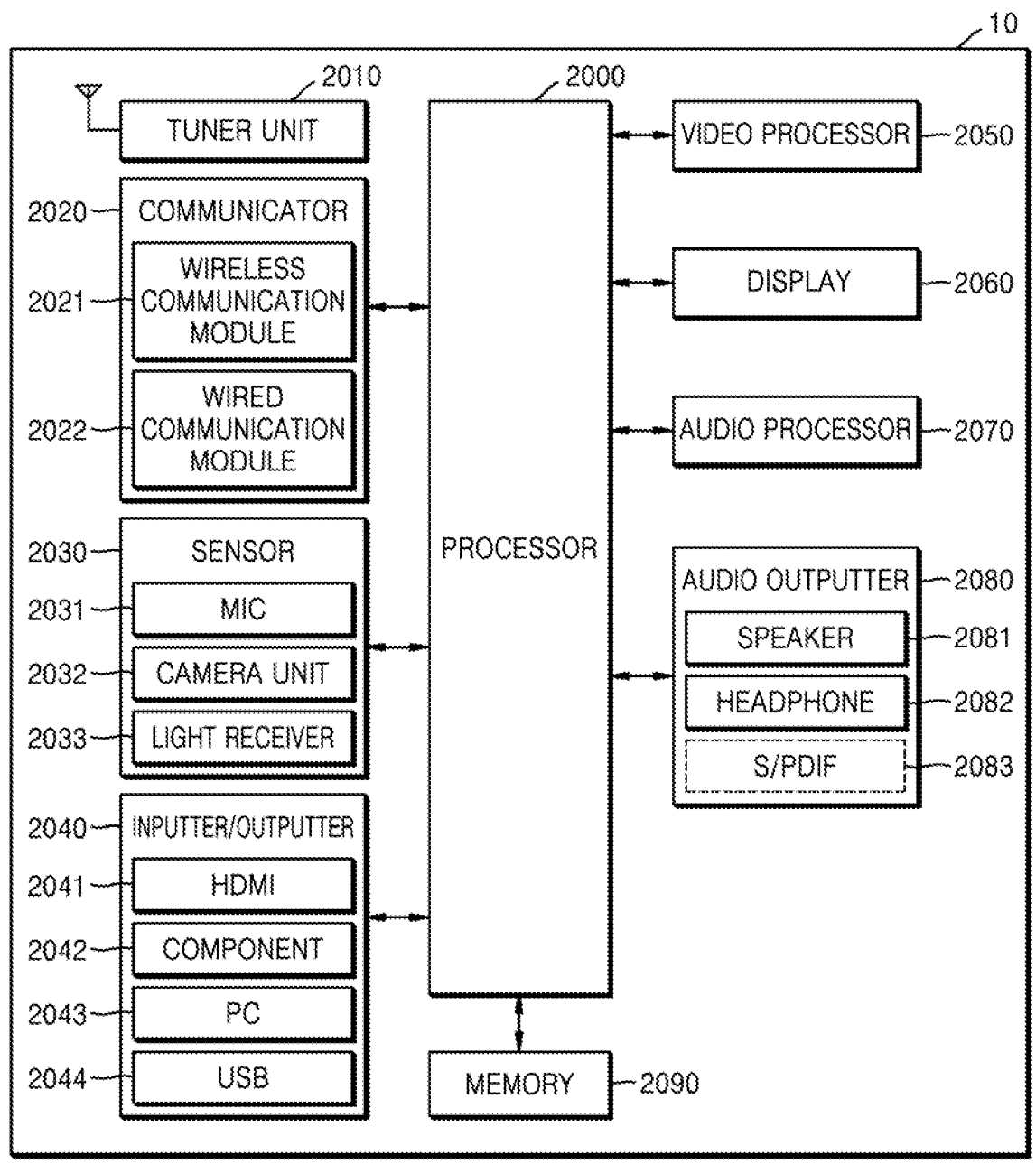
FIG. 14 is a block diagram of an electronic device according to various embodiments of the present disclosure.

FIG. 14 is a block diagram of an electronic device according to various embodiments of the present disclosure.

As shown in FIG. 14, the electronic device 10 may further include at least one of a memory 2090, a tuner unit 2010, a sensor 2030, an inputter/outputter 2040, a video processor 2050, an audio processor 2070, and an audio outputter 2080 in addition to a processor 2000, a communicator 2020, and a display 2060.

The processor 2000, the communicator 2020, and the display 2060 may respectively correspond to the processor 12, the communicator 13, and the display 11 of FIG. 1, and thus will not be redundantly described.

The processor 2000 may execute, for example, software stored in the memory 2090 (e.g., a program) to control at least one other component (e.g., a hardware or software component) of the electronic device 10 coupled with the processor 2010, and may perform various data processing or computation. According to one embodiment, as at least part of the data processing or computation, the processor 2010 may load a command or data received from another component in the memory (e.g., a volatile memory) 2090, process the command or the data stored in the memory 2090, and store resulting data in the memory (e.g., the non-volatile memory). According to an embodiment of the present disclosure, the processor 2010 may include a main processor (e.g., a central processing unit (CPU) or an application processor (AP)), and an auxiliary processor (e.g., a GPU, an image signal processor (ISP), a sensor hub processor, or a communication processor (CP)) that is operable independently from, or in conjunction with, the main processor. Additionally or alternatively, the auxiliary processor may be adapted to consume less power than the main processor, or to be specific to a specified function. The auxiliary processor may be implemented as separate from, or as part of the main processor. The auxiliary processor may control at least some of functions or states related to at least one component among the components of the electronic device 10, instead of the main processor while the main processor is in an inactive (e.g., sleep) state, or together with the main processor while the main processor is in an active state (e.g., executing an application).

The communicator 2020 may connect the electronic device 10 with the external device 20, the external server 30, or the payment server 40 under control of the processor 2010. For example, the communicator 2020 may support establishing a direct (e.g., wired) communication channel or a wireless communication channel between the electronic device 10 and the external device 20, the external server 30, or the payment server 40 and performing communication via the established communication channel. The communicator 2020 may include one or more communication processors that are operable independently from the processor 2010 (e.g., the application processor (AP)) and support a direct (e.g., wired) communication or a wireless communication. According to an embodiment of the present disclosure, the communicator 2020 may include a wireless communication module 2021 (e.g., a cellular communication module, a short-range wireless communication module, or a global navigation satellite system (GNSS) communication module) or a wired communication module 2022 (e.g., a local area network (LAN) communication module or a power line communication (PLC) module). A corresponding one of these communication modules may communicate with the external device 20, the external server 30, or the payment server 40 via a first network (e.g., a short-range communication network, such as Bluetooth™, wireless-fidelity (Wi-Fi) direct, or infrared data association (IrDA)) or a second network (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The display 2060 may visually provide information (e.g., a UI, etc.) to the outside (e.g., a user) of the electronic device 10. When the display 2060 and a touch pad are constructed as a touch screen in a layer structure, the display 2060 may be used as an input device as well as an output device. The display 2060 may include at least one of a liquid crystal display (LCD), a thin film transistor (TFT) LCD, an organic light-emitting diode (OLED), a flexible display, a three-dimensional (3D) display, and an electrophoretic display. According to implementation types of the electronic device 10, the electronic device 10 may include two or more displays 2060.

The tuner unit 2010 selects a frequency of a channel the electronic device 10 desires to receive from among many electric wave components by tuning the frequency through amplification, mixing, resonance, or the like with respect to a broadcast signal received wiredly or wirelessly. The broadcasting signal may include audio, video, and additional information (for example, an electronic program guide (EPG)).

The broadcasting signal received through the tuner unit 2010 may be decoded (e.g., audio-decoded, video-decoded, or additional-information-decoded) and separated into audio, video, and/or additional information. The separated audio, video, and/or additional information may be stored in the memory 2090 under control of the processor 2010. There may be one or a plurality of tuner units 2010 in the electronic device 10. The tuner unit 2010 may be implemented as all-in-one with the electronic device 10 or as a separate device including a tuner unit electrically connected with the electronic device 10 or a tuner unit (not shown) connected to the inputter/outputter 2040.

The sensor 2030 senses a user's voice, a user's image, or a user's interaction, and may include a microphone 2031, a camera unit 2032, and a light receiver 2033.

The microphone 2031 may receive an uttered voice of the user. The microphone 2031 may convert the received voice into an electric signal and output the electric signal to the processor 2010. The camera unit 2032 may receive an image (e.g., a continuous frame) corresponding to a user's motion including a gesture in a camera recognition range. The optical receiver 2033 may receive an optical signal (including a control signal) received from an external remote control device (e.g., a remote controller). The light receiver 2033 may receive a light signal corresponding to a user input (e.g., a touch, a press, a touch gesture, a voice, or a motion) from a control device. A control signal may be extracted from the received optical signal under control of the processor 2010.

The inputter/outputter 2040 may receive video (e.g., moving images, etc.), audio (e.g., a voice, music, etc.), and additional information (e.g., an EPG, etc.) from the outside of the electronic device 10, under control of the processor 2010. The inputter/outputter 2040 may include one of an HDMI port 2041, a component jack 2042, a PC port 2043, and a USB port 2044. The inputter/outputter 2040 may include a combination of the HDMI port 2041, the component jack 2042, the PC port 2043, and the USB port 2044.

The video processor 2050 may process an image to be displayed by the display 2060 and may perform various image processing such as decoding, scaling, noise filtering, frame rate conversion, resolution conversion, etc., with respect to video data.

The audio processor 2070 may process audio data. The audio processor 2070 may perform various processing such as decoding, amplification, noise filtering, etc., on the audio data.

The audio output interface 2080 outputs audio included in a broadcast signal received through the tuner unit 2010, audio input through the communicator 2020 or the I/O interface 2040, and audio stored in the memory 2090, under control of the processor 2010. The audio outputter 2080 may include at least one of a speaker 2081, a headphone output terminal 2082, or a Sony/Phillips digital interface (S/PDIF) output terminal 2083.

The memory 2090 according to an embodiment may store programs for processing and control of the processor 2010 and store data input to or output from the electronic device 10.

The memory 300 may include a storage medium of at least one type of a flash memory type, a hard disk type, a multimedia card micro type, a card type memory (e.g., a secure digital (SD) or extreme digital (XD) memory, etc.), a random access memory (RAM), a static random access memory (SRAM), a read-only memory (ROM), an electrically erasable programmable read-only memory (EE-PROM), a programmable read-only memory (PROM), a magnetic memory, a magnetic disk, an optical disk, and so forth.

The memory 2090 according to an embodiment of the present disclosure may store one or more instructions set to cause the electronic device to perform operations of displaying a first UI corresponding to first UI data received from an external server on a screen, transmitting second UI data corresponding to the first UI to the external device, receiving coordinates selected by a user using the external device from the external device, obtaining additional information related to the first UI when the coordinates correspond to a position of the first UI displayed on the screen, and transmitting the additional information and an execution command of an application using the additional information to the external device.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the present disclosure, the module may be implemented in a form of an application-specific integrated circuit (ASIC).

Various embodiments as set forth herein may be implemented as software (e.g., the program) including one or more instructions that are stored in a storage medium (e.g., a memory 2090) that is readable by a machine (e.g., the electronic device 101). For example, a processor (e.g., the processor 2120) of the machine (e.g., the electronic device 10) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices directly. When distributed online, at least part of the computer program product may be temporarily generated or at least temporarily stored in the machine-readable storage medium, such as memory of the manufacturers server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A method of controlling an external device by an electronic device, the method comprising:
    displaying, on a screen of the electronic device, a first user interface (UI) corresponding to first UI data received from an external server;
    transmitting, to the external device, second UI data corresponding to the first UI;
    receiving, from the external device, coordinates selected by a user using the external device;
    identifying coordinates, which correspond to the coordinates received from the external device, on the screen of the electronic device, based on an operation mode of the external device indicating whether the external device is in a portrait mode or a landscape mode;
    obtaining additional information related to the first UI when the identified coordinates correspond to a position of the first UI displayed on the screen; and
    transmitting, to the external device, the additional information and an execution command of an application using the additional information.

2. The method of claim 1, wherein the additional information comprises contact information, and
    the execution command of the application comprises an execution command of a phone application, an execution command of an e-mail application, or an execution command of a messenger application.

3. The method of claim 1, wherein the additional information comprises payment information, and
    the execution command of the application comprises an execution command of a payment application.

4. The method of claim 1, wherein the obtaining of the additional information related to the first UI comprises obtaining the additional information related to the first UI from the external server.

5. The method of claim 1, further comprising:
    transmitting identification information of the external device to the external server;
    receiving third UI data reflecting a screen of the external device from the external server in response to the transmitting of the identification information; and
    transmitting, to the external device, fourth UI data corresponding to the third UI data.

6. The method of claim 5, wherein the identification information of the external device comprises identification information obtained by the electronic device in a screen sharing connection procedure with the external device.

7. The method of claim 1, wherein the transmitting of the second UI data to the external device comprises transmitting video data displayed on the screen, together with the second UI data, to the external device.

8. The method of claim 1, wherein the transmitting of the second UI data to the external device comprises transmitting the second UI data to the external device through a screen sharing channel, and
    the receiving of the coordinates from the external device comprises receiving the coordinates through a user input back channel.

9. The method of claim 1, wherein the first UI data comprises data generated according to a remote communication protocol, and
    the second UI data comprises data generated according to a short-range communication protocol.

10. An electronic device comprising:
    a communicator implemented by a processor and configured to communicate with an external server and an external device;
    a display displaying a user interface (UI); and
    the processor operatively connected with the communicator and the display,
    wherein the processor is configured to:
    display a first UI corresponding to first UI data received from the external server on a screen of the display;
    control the communicator to transmit, to the external device, second UI data corresponding to the first UI;
    control the communicator to receive, from the external device, coordinates selected by a user using the external device;
    identify coordinates, which correspond to the coordinates received from the external device, on the screen of the display, based on an operation mode of the external device indicating whether the external device is in a portrait mode or a landscape mode;
    obtain additional information related to the first UI when the identified coordinates correspond to a position of the first UI displayed on the screen; and
    control the communicator to transmit, to the external device, the additional information and an execution command of an application using the additional information.

11. The electronic device of claim 10, wherein the additional information comprises contact information, and
    the execution command of the application comprises an execution command of a phone application, an execution command of an e-mail application, or an execution command of a messenger application.

12. The electronic device of claim 10, wherein the additional information comprises payment information, and
    the execution command of the application comprises an execution command of a payment application.

13. The electronic device of claim 10, wherein the processor is configured to obtain the additional information related to the first UI from the external server, when obtaining the additional information related to the first UI.

14. The electronic device of claim 10, wherein the processor is configured to:
    control the communicator to transmit identification information of the external device to the external server;
    control the communicator to receive third UI data reflecting a screen of the external device from the external server in response to the transmitting of the identification information; and
    control the communicator to transmit, to the external device, fourth UI data corresponding to the third UI data.

* * * * *